(12) United States Patent
Naruse

(10) Patent No.: US 11,007,874 B2
(45) Date of Patent: *May 18, 2021

(54) VEHICLE DISPLAY DEVICE

(71) Applicant: DENSO CORPORATION, Kariya (JP)

(72) Inventor: Yoichi Naruse, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,042

(22) Filed: Aug. 14, 2019

(65) Prior Publication Data

US 2019/0381885 A1 Dec. 19, 2019

Related U.S. Application Data

(63) Continuation of application No. PCT/JP2018/001851, filed on Jan. 23, 2018.

(30) Foreign Application Priority Data

Feb. 22, 2017 (JP) .............................. JP2017-031370

(51) Int. Cl.
*G02B 27/01* (2006.01)
*B60K 35/00* (2006.01)
(Continued)

(52) U.S. Cl.
CPC .............. *B60K 35/00* (2013.01); *B60R 11/02* (2013.01); *G02B 27/01* (2013.01); *G09F 9/00* (2013.01);
(Continued)

(58) Field of Classification Search
CPC ............ B60K 35/00; B60K 2370/1529; B60K 2370/349; B60K 2370/176; B60K 2370/797; B60K 2370/167; B60K 2370/31; B60K 2370/21; B60K 2370/334; B60K 2370/155; B60R 11/02; B60R 1/00;
(Continued)

(56) References Cited

U.S. PATENT DOCUMENTS

| | | | | |
|---|---|---|---|---|
| 2010/0177203 | A1* | 7/2010 | Lin | H04N 5/232 348/222.1 |
| 2019/0126824 | A1* | 5/2019 | Oba | E05F 15/70 |
| 2019/0217780 | A1* | 7/2019 | Yamaguchi | B60R 11/04 |

FOREIGN PATENT DOCUMENTS

| | | |
|---|---|---|
| JP | 2008001182 A | 1/2008 |
| JP | 2014136520 A | 7/2014 |

OTHER PUBLICATIONS

U.S. Appl. No. 16/541,045, filed Aug. 14, 2019, Yoichi Naruse.
U.S. Appl. No. 16/541,059, filed Aug. 14, 2019, Yoichi Naruse.

\* cited by examiner

*Primary Examiner* — Rodney Amadiz
(74) *Attorney, Agent, or Firm* — Harness, Dickey & Pierce, P.L.C.

(57) ABSTRACT

A vehicle display device includes a conversion block that converts, based on correction data stored in a memory, an imaging pixel value of a specific pixel portion captured on a near side of at least one of a vanishing point or a horizon line in a camera image acquired by an outside camera into a correction pixel value in accordance with outside brightness detected by a brightness sensor, and a display control block that controls a virtual image display luminance of a display image displayed by a head-up display in correspondence with the correction pixel value converted from the imaging pixel value by the conversion block.

11 Claims, 27 Drawing Sheets

(51) Int. Cl.
*B60R 11/02* (2006.01)
*G09F 9/00* (2006.01)
*G09G 5/36* (2006.01)
*H04N 5/232* (2006.01)

(52) U.S. Cl.
CPC ........... *G09G 5/36* (2013.01); *H04N 5/23293* (2013.01); *G02B 2027/014* (2013.01); *G02B 2027/0112* (2013.01); *G02B 2027/0138* (2013.01)

(58) Field of Classification Search
CPC .............. B60R 2300/205; G02B 27/01; G02B 2027/0112; G02B 2027/0138; G02B 2027/014; G02B 2027/0118; G02B 27/0101; H04N 5/23293; H04N 5/247; G09G 2320/066; G09G 2380/10; G09G 2360/144; G09G 5/10; G09G 5/36; G09G 3/002; G09G 2320/0626; G09F 27/005; G09F 21/049; G09F 9/00; G06F 3/147
See application file for complete search history.

FIG. 12

| PIXEL No. | Tc | | |
|---|---|---|---|
| | R | G | B |
| 1 | 150 | 148 | 130 |
| 2 | 158 | 140 | 138 |
| ⋮ | ⋮ | ⋮ | ⋮ |
| X | 185 | 200 | 252 |
| X+1 | 190 | 195 | 252 |
| ⋮ | ⋮ | ⋮ | ⋮ |
| Y | 150 | 130 | 50 |
| Y+1 | 150 | 135 | 55 |
| ⋮ | ⋮ | ⋮ | ⋮ |
| N-1 | 27 | 140 | 252 |
| N | 30 | 140 | 255 |

Pcm ⟨R⟩ — pixel 1
Pcm ⟨G⟩ — pixel 2
Pcm ⟨B⟩ — pixels X, X+1
Pcm ⟨R⟩ — pixels Y, Y+1
Pcm ⟨B⟩ — pixel N-1
Pcm ⟨G⟩ — pixel N

| PIXEL No. | Tc | | |
|---|---|---|---|
| | R | G | B |
| 1 | 150 | 148 | 130 |
| 2 | 158 | 140 | 138 |
| ⋮ | ⋮ | ⋮ | ⋮ |
| W | 185 | 200 | 252 |
| W+1 | 190 | 200 | 252 |
| ⋮ | ⋮ | ⋮ | ⋮ |
| Q | 190 | 130 | 50 |
| Q+1 | 190 | 135 | 55 |
| ⋮ | ⋮ | ⋮ | ⋮ |
| N-1 | 27 | 140 | 252 |
| N | 30 | 140 | 255 |

Pcl ⟨G⟩
Pcl ⟨R⟩
Pcl ⟨R⟩
Pcl ⟨B⟩

FIG. 25A

| Td0 | Tr | Td |
|---|---|---|
| 0 | 0 | 0 |
| 0 | 1 | 0 |
| ⋮ | ⋮ | ⋮ |
| 125 | 125 | 46 |
| ⋮ | ⋮ | ⋮ |
| 125 | 255 | 93 |
| ⋮ | ⋮ | ⋮ |
| 200 | 125 | 73 |
| ⋮ | ⋮ | ⋮ |
| 255 | 254 | 190 |
| 255 | 255 | 191 |

Dct

FIG. 25B

| Sd0 | Tr | Sd |
|---|---|---|
| 0 | 0 | 0 |
| 0 | 1 | 0 |
| ⋮ | ⋮ | ⋮ |
| 100 | 125 | 12 |
| ⋮ | ⋮ | ⋮ |
| 100 | 255 | 25 |
| ⋮ | ⋮ | ⋮ |
| 10000 | 125 | 1225 |
| ⋮ | ⋮ | ⋮ |
| 100000 | 254 | 24902 |
| 100000 | 255 | 25000 |

Dcs

| PIXEL No. | Tc | | |
|---|---|---|---|
| | Y | U | V |
| 1 | 200 | 110 | 120 |
| 2 | 208 | 100 | 95 |
| ⋮ | ⋮ | ⋮ | ⋮ |
| N-1 | 50 | 100 | 240 |
| N | 43 | 95 | 255 |

VEHICLE DISPLAY DEVICE

CROSS REFERENCE TO RELATED APPLICATIONS

The present application is a continuation application of International Patent Application No. PCT/JP2018/001851 filed on Jan. 23, 2018, which designated the U.S. and claims the benefit of priority from Japanese Patent Application No. 2017-31370 filed on Feb. 22, 2017. The entire disclosures of all of the above applications are incorporated herein by reference.

TECHNICAL FIELD

The present disclosure relates to a vehicle display device for visually displaying a display image as a virtual image in a visual recognition region in a vehicle compartment by projecting the display image onto a projection member that transmits an outside scenery.

BACKGROUND

Conventionally, a vehicle display device may project a display image onto a projection member using light emitted from a head-up display (HUD: Head-Up Display). In these types of vehicle display devices, there is a concern that luminance from the outside may adversely affect the visibility of the projected image.

SUMMARY

According to one aspect of the present disclosure, a vehicle display device is provided in a vehicle mounted with an outside camera that acquires a camera image by imaging outside scenery and a brightness sensor that detects an outside brightness of the outside scenery, the vehicle display device is configured to project a display image onto a projection member, which transmits the outside scenery, to display the display image as a visible virtual image in a visual recognition region in a vehicle compartment, the vehicle display device including a head-up display that emits light to form the display image, a memory that stores, as correction data, a correlation of a correction pixel value with respect to an imaging pixel value, the correction pixel value being converted from the imaging pixel value forming the camera image by a correction according to the outside brightness, a conversion block that converts, based on the correction data stored in the memory, the imaging pixel value of a specific pixel portion captured on a near side of at least one of a vanishing point or a horizon line in the camera image acquired by the outside camera into the correction pixel value in accordance with the outside brightness detected by the brightness sensor, and a display control block that controls a virtual image display luminance of the display image displayed by the head-up display in correspondence with the correction pixel value converted from the imaging pixel value by the conversion block.

BRIEF DESCRIPTION OF DRAWINGS

The above and other objects, features and advantages of the present disclosure will become more apparent from the following detailed description made with reference to the accompanying drawings. In the drawings:

FIG. 12 is an image diagram showing an imaging pixel value of a camera image according to the second embodiment.

FIG. 16 is an image diagram showing an imaging pixel value of a camera image according to the fourth embodiment, FIG. 25A is an image diagram showing pixel value control data according to the seventh embodiment, and FIG. 25B is an image diagram showing luminance value control data according to the seventh embodiment.

DESCRIPTION OF EMBODIMENTS

Figure 1:
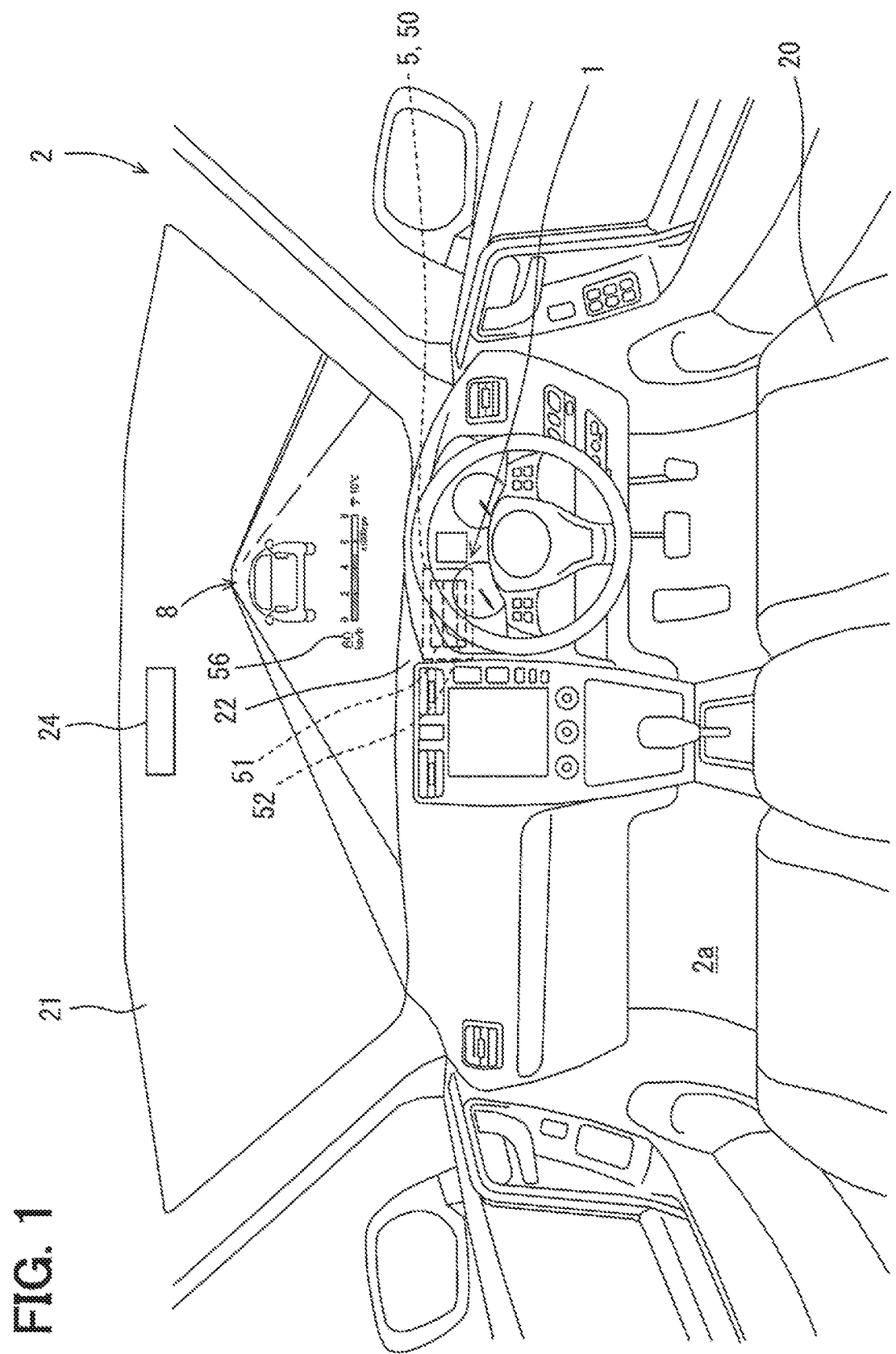
FIG. 1 is an internal view showing a vehicle compartment of a host vehicle equipped with a vehicle display device according to a first embodiment.

Hereinafter, a plurality of embodiments of the present disclosure will be described with reference to the drawings. Incidentally, the same reference numerals are assigned to the corresponding components in each embodiment, and thus, duplicate descriptions may be omitted. When only a part of the configuration is described in each embodiment, the configuration of the other embodiments described above can be applied to other parts of the configuration. Further, not only the combinations of the configurations explicitly shown in the description of the respective embodiments, but also the configurations of the plurality of embodiments can be partially combined even if the configurations are not explicitly shown if there is no problem in the combination in particular.

First Embodiment

First, consider a reference example vehicle display device that projects a display image onto a projection member using light emitted from a head-up display. In this reference example, a camera image is acquired by capturing an outside scenery as a background of the display image with an outside camera so that a background luminance representing the outside brightness of the external scene can be specified. The background luminance specified from the camera image as described above is used in the control of the virtual image display luminance for displaying the display image virtually by the HUD, thereby making it possible to reduce the deterioration of the visibility of the display image.

However, in order to properly acquire a camera image, in general, there is a need to perform a filtering process such as an exposure control and a gain control in accordance with the outside brightness in an outside camera. For that reason, in spite of day and night having different outside brightness, imaging pixel values forming the camera image have the same value or a close value depending on the filtering process, as a result of which, in the reference example device described above, the specified background luminance may not reflect an actual outside brightness. This leads to a concern that a contrast defect occurs in which the contrast of the display image with respect to the outside scenery is insufficient or excessive, thereby making it difficult to reduce the visibility deterioration.

Figure 2:
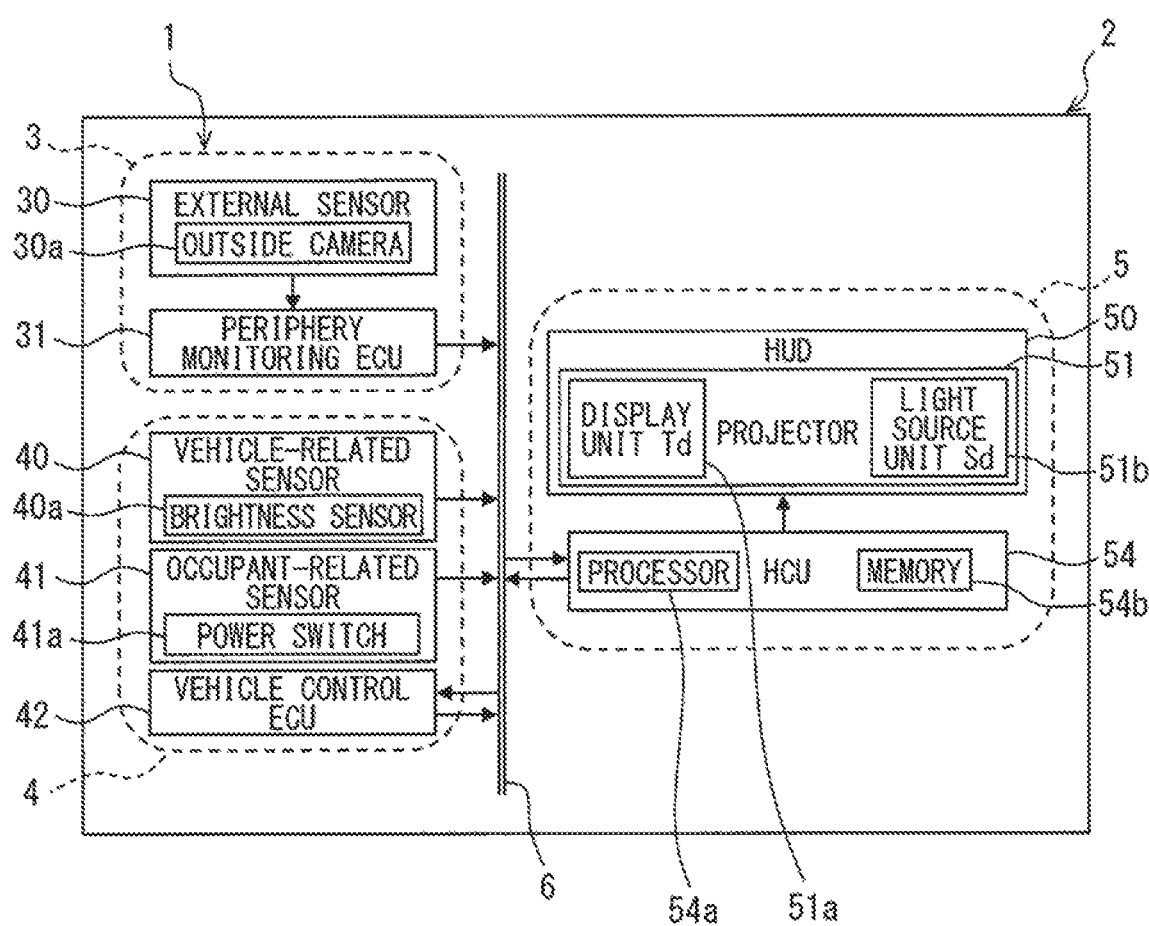
FIG. 2 is a block diagram showing the vehicle display device according to the first embodiment.

In this regard, a driving support system 1 according to a first embodiment of the present disclosure is mounted on a vehicle 2 as shown in FIGS. 1 and 2. The driving support system 1 includes a periphery monitoring system 3, a vehicle control system 4, and a vehicle display device 5. Those elements 3, 4, and 5 are connected to each other through an in-vehicle network 6, such as a LAN (Local Area Network), for example.

As shown in FIG. 2, the periphery monitoring system 3 includes a periphery sensor 30 and a periphery monitoring ECU (Electronic Control Unit) 31. The periphery sensor 30 detects, for example, other obstacles such as other vehicles, artificial structures, humans and animals, which may collide in the outside of the vehicle 2, and traffic signs such as velocity signs and various warning signs present in the outside of the vehicle 2 (i.e., outside the vehicle compartment 2a). The periphery sensor 30 is, for example, one or a plurality of types including at least the outside camera 30a, among the outside camera 30a, the sonar, the radar, the LIDAR (Light Detection and Ranging/Laser Imaging Detection and Ranging, and the like.

Figure 3:
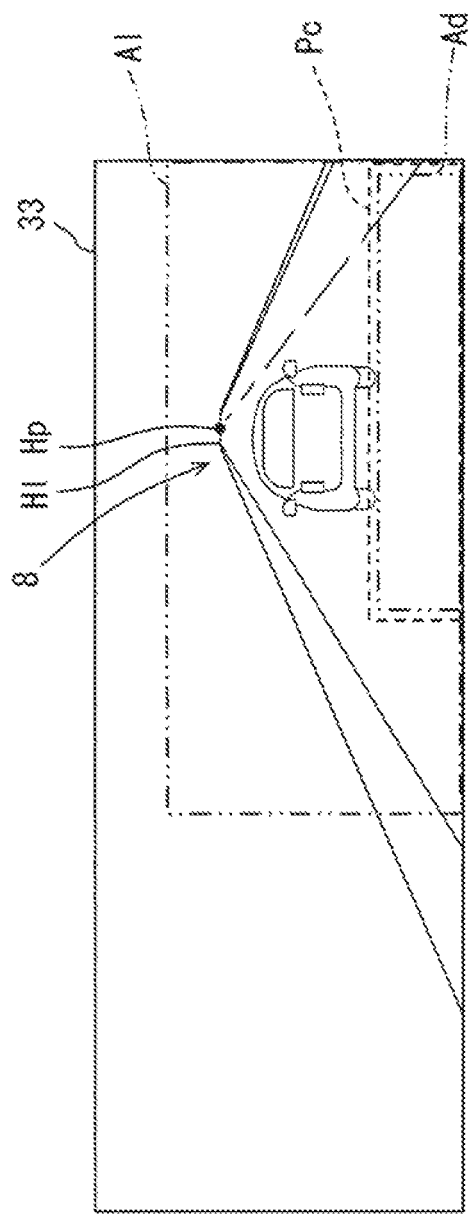
FIG. 3 is an image diagram showing a camera image according to the first embodiment.
Figure 4:
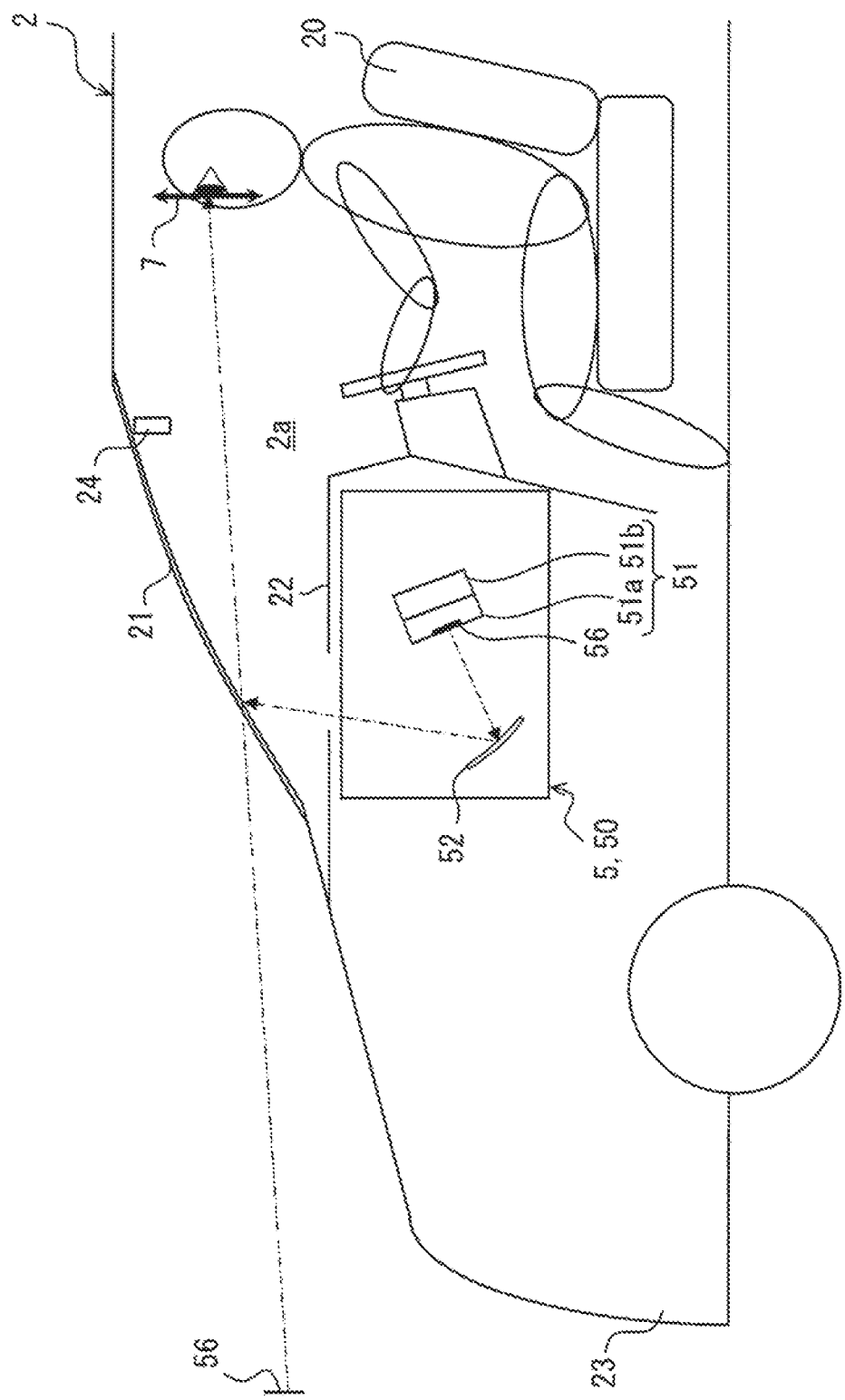
FIG. 4 is a block diagram showing a configuration of an HUD according to the first embodiment.
Figure 5:
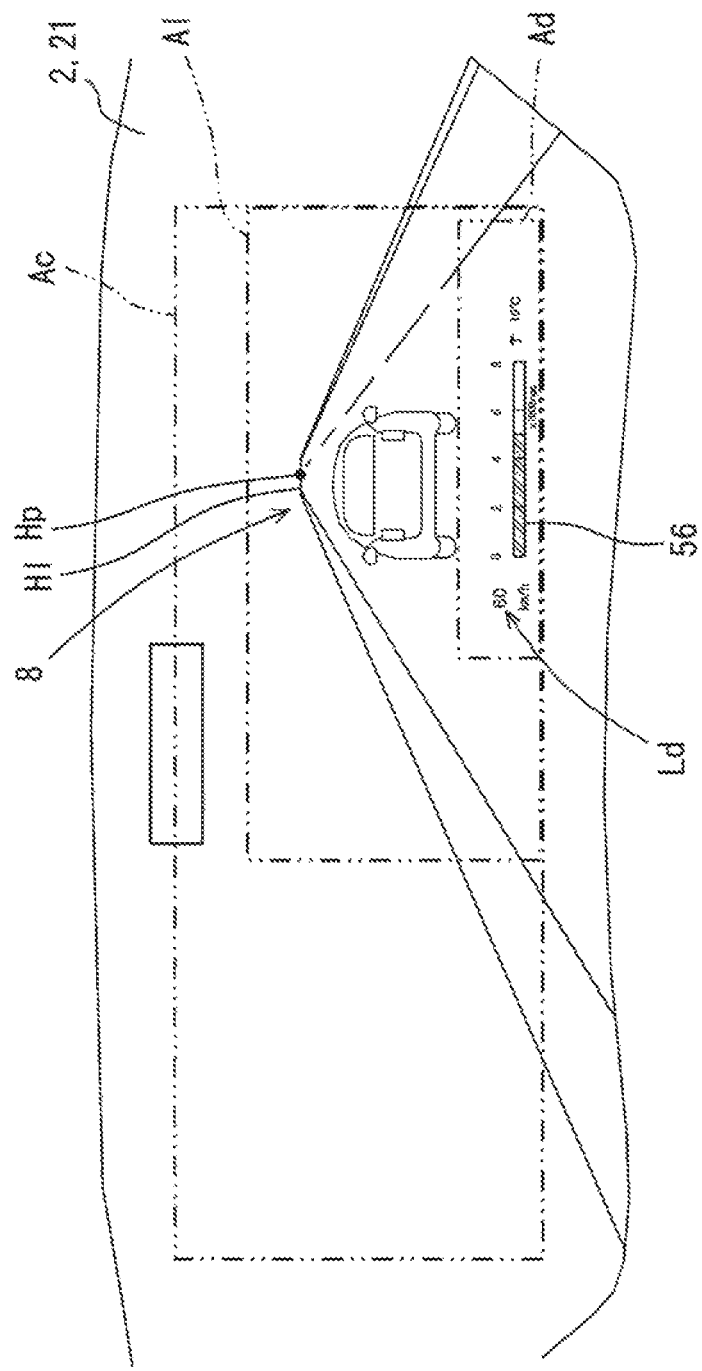
FIG. 5 is a front view showing a virtual image display state of a display image according to the first embodiment.

In this example, an outside camera 30a, which is generally mounted on the vehicle 2, acquires a camera image 33 by capturing an image of a predetermined range of an outside scenery 8 existing in front of a vehicle compartment 2a in an external environment of the vehicle 2 shown in FIG. 3, The outside camera 30a is, for example, a monocular type or a compound eye type, and is mounted on a bumper 23, an inner rearview mirror 24, or the like of the vehicle 2 shown in FIGS. 1 and 4, As a result, an imaging region Ac of the outside camera 30a shown in FIG. 5 is set in an area of the outside scenery 8 which can be visually recognized by an occupant on a driver's seat 20 through a front windshield 21 of the vehicle 2 in the vehicle compartment 2a.

Figure 6:
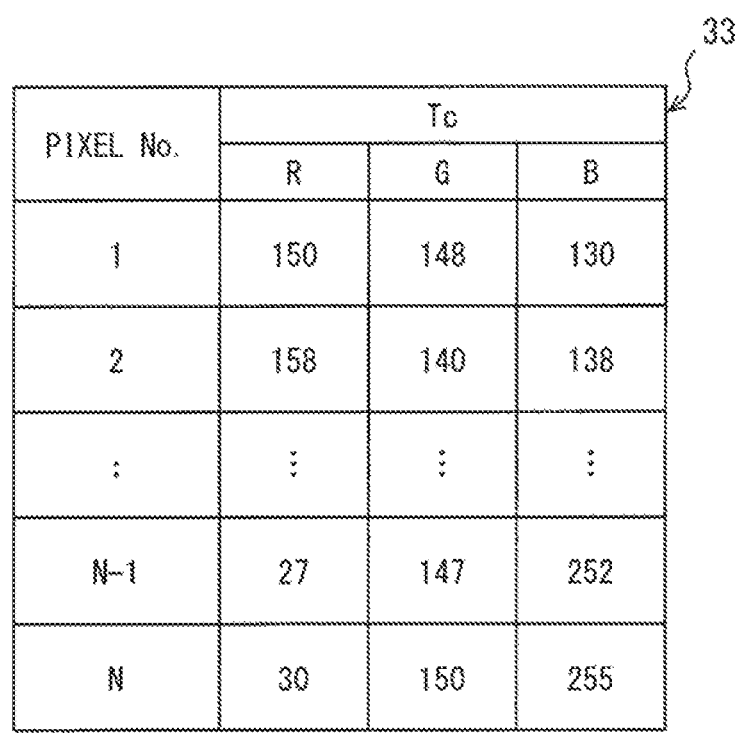
FIG. 6 is an image diagram showing an imaging pixel value of the camera image according to the first embodiment.

As shown in FIG. 6, the camera image 33 acquired by the outside camera 30a is configured by imaging pixel values Tc of multiple colors. Therefore, the imaging pixel value Tc of the present embodiment represents a gradation value sensed by each pixel of the outside camera 30a for each of the colors of red (R), green (G) and blue (B) in 256 gradations of 0 to 255. In other words, the outside camera 30a of the present embodiment generates the imaging pixel value Tc of each pixel in an RGB data format.

The periphery monitoring ECU 31 shown in FIG. 2 mainly includes a microcomputer having a processor and memories, and is connected to the periphery sensor 30 and the in-vehicle network 6. The periphery monitoring ECU 31 acquires, for example, obstacle information, traffic sign information, and the like based on an output signal from the periphery sensor 30.

The vehicle control system 4 includes a vehicle-related sensor 40, an occupant-related sensor 41, and a vehicle control ECU 42, The vehicle-related sensor 40 is connected to the in-vehicle network 6. The vehicle-related sensor 40 acquires, for example, driving state information, navigation information, traffic sign information, driving environment information, and the like of the vehicle 2. The vehicle-related sensor 40 is, for example, one or multiple types including at least a brightness sensor 40a among the brightness sensor 40a, a vehicle speed sensor, a rotational speed sensor, a steering angle sensor, a fuel sensor, a water temperature sensor, a communication device, and the like.

In this example, the brightness sensor 40a, which is generally mounted on the vehicle 2, detects the illuminance or luminance of a predetermined range of the outside scenery 8 existing in front of the vehicle compartment 2a in the outside of the vehicle 2 shown in FIGS. 1 and 5, as an outside brightness Lo. The brightness sensor 40a is, for example, a phototransistor, a photodiode, or the like, and is mounted on an instrument panel 22, the inner rearview mirror 24, or the like of the vehicle 2 shown in FIGS. 1 and 4. As a result, a detection region AI of the brightness sensor 40a shown in FIG. 5 is set in an area of the outside scenery 8, which can be visually recognized by the occupant through the front windshield 21 and included in the imaging region Ac of the outside camera 30a.

As shown in FIG. 2, the occupant-related sensor 41 is connected to the in-vehicle network 6. The occupant-related sensor 41 detects a state or operation of the occupant who has been present in the vehicle compartment 2a of the vehicle 2. The occupant-related sensor 41 is, for example, one or multiple types including at least a power switch 41a among the power switch 41a, a display setting switch, an occupant state monitor, a turn switch, and the like.

In this example, the power switch 41a is operated by an occupant inside or outside the vehicle compartment 2a to start an internal combustion engine or a motor generator of the vehicle 2, thereby detecting the operation. The power switch 41a includes, for example, one type or multiple types of a rotational operation type and a push operation type by an occupant, a remote operation type by an electronic key, and the like.

The vehicle control ECU 42 mainly includes a microcomputer having a processor and memories, and is connected to the in-vehicle networks 6. The vehicle control ECU 42 includes one or plural types of an engine control ECU, a motor control ECU, a brake control ECU, a steering control ECU, an integrated control ECU, and the like.

As shown in FIGS. 1, 2, and 4, the vehicle display device 5 includes an HUD 50 and an HCU (HMI (Human Machine Interface) Control Unit)) 54 for displaying a display image 56 as a virtual image in the vehicle compartment 2a.

The HUD 50 is installed in the instrument panel 22 in the vehicle compartment 2a, The HUD 50 forms a color display image 56 by light emitted from a projector 51. Therefore, as shown in FIGS. 2 and 4, the projector 51 of the present embodiment is configured by combining a display unit 51a and a light source unit 51b together. In this example, the display unit 51a mainly includes, for example, a dot matrix type TFT liquid crystal panel or the like. The display unit 51a forms the display image 56 by driving the respective pixels in accordance with a display pixel value Td controlled by the HCU 54. On the other hand, the light source unit 51b mainly includes an LED (Light Emitting Diode), for example. The light source unit 51b is energized according to a light source luminance value Sd controlled by the HCU 54 to illuminate the display unit 51a and emit a light of the display image 56. With the configuration described above, a virtual image display luminance Ld of the entire display image 56 shown in FIG. 5 is determined by the combination of the display pixel value Td of each pixel of the display image 56 formed in the display unit 51a and the light source luminance value Sd of the light source unit 51b that emits the light of the display image 56 together.

The displayed image 56 formed by the projector 51 in a light emission state represents various information to be notified the occupant of in the vehicle compartment 2a. Specifically, the display image 56 represents, for example, not only driving state information such as vehicle speed information and engine speed information shown in FIGS. 1 and 5, but also navigation information such as route guidance information and traffic congestion information, traffic sign information such as speed sign information, and driving environment information such as weather information and road surface information. In addition to those pieces of information, the display image 56 may represent, for example, music information, video information, mobile communication information, and the like provided in the vehicle compartment 2a.

A light beam of the display image 56 formed by the projector 51 so as to represent predetermined information is guided by an optical system 52 such as a concave mirror as shown in FIGS. 1 and 4, thereby being projected onto the front windshield 21 as a projection member. At that time, the front windshield 21 made of a light transmissive glass transmits the light beam from the outside scenery 8. As a result, the light beam of the display image 56 reflected by the front windshield 21 and the light beam from the outside scenery 8 transmitted through the shield 21 are perceived by the occupant on the driver's seat 20 in the vehicle compartment 2a.

As described above, the display image 56 is superimposed on the outside scenery 8 as the virtual image imaged ahead of the front windshield 21 so that the display image 56 can be viewed by the occupant in a visual recognition region 7 within the vehicle compartment 2a. Therefore, as shown in FIG. 5, the display region Ad in which the virtual image of the display image 56 is displayed is set to a range in which the occupant can visually recognize the image through the front windshield 21, and is also included in the imaging region Ac of the outside camera 30a and the detection region AI of the brightness sensor 40a.

As shown in FIG. 2, the HCU 54 mainly includes a microcomputer having a processor 54a and a memory 54b, and is connected to the HUD 50 and the in-vehicle network 6. The HCU 54 controls the virtual image display of the display image 56 by the HUD 50. At that time, the HCU 54 executes a display control based on, for example, information acquired or detected by the ECUs 31 and 42 and the sensors 40 and 41, and information stored in the memory 54b. The memory 54b of the HCU 54 and the memories of the other various ECUs are configured with the use of one or multiple storage media such as, for example, a semiconductor memory, a magnetic medium, an optical medium, or the like.

In this example, the HCU 54 reads out the display image 56 stored in advance in the memory 54b, and controls the virtual image display state of the display image 56 by the HUD 50. For that purpose, the HCU 54 executes the display control programs stored in advance in the memory 54b by the processor 54a, thereby functionally realizing the steps of a display control flow shown in FIG. 7. The display control flow is started in response to an on-operation of the power switch 41a, and completed in response to an off-operation of the switch 41a. S in the display control flow means each step.

Figure 7:
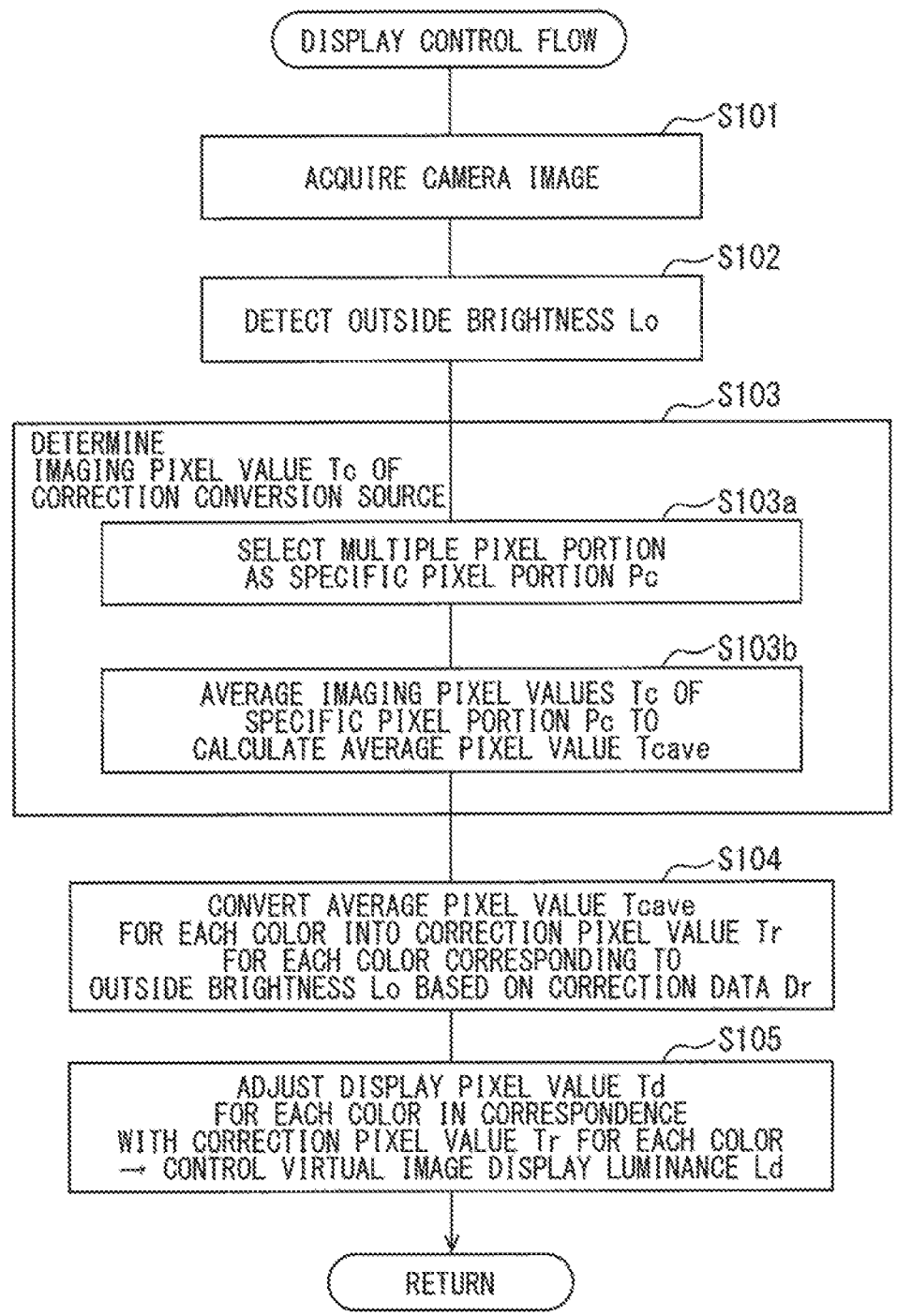
FIG. 7 is a flowchart showing a display control flow according to the first embodiment.

As shown in FIG. 7, in S101 of the display control flow, the outside camera 30a captures an image of the imaging region Ac of the outside scenery 8. As a result, in S101, as shown in FIG. 6, the camera image 33 configured by the imaging pixel values Tc for the respective colors in each pixel is acquired.

In S102, the outside brightness Lo of the outside scenery 8 is detected by the brightness sensor 40a. As a result, in S102, the illuminance or luminance in the detection region AI superimposed on the imaging region Ac in the outside scenery 8 is acquired as the present outside brightness Lo shown in FIG. 5.

In S103, the imaging pixel value Tc as a correction conversion source is determined for each of the colors from the imaging pixel value Tc of each pixel in the camera image 33 acquired in S101. More specifically, in S103, first, a multiple pixel portion obtained by imaging a portion superimposed on a display region Ad is selected as specific pixel portion Pc in the camera image 33 in S103a, limited to the outside scenery 8 on a near side (that is, on the vehicle 2 side) of at least one of a vanishing point Hp and a horizon line HI shown in FIGS. 3 and 5. At this time, in the present embodiment, a pixel area which is a fixed pixel area set in advance in the multiple pixel portion continuous in the vertical and horizontal directions as shown in FIG. 3 and which is included in the detection region AI of the brightness sensor 40a in the outside scenery 8 and which captures an image of a range including the display region Ad is selected as the specific pixel portion Pc. Next, in S103, in S103b of FIG. 7, the imaging pixel values Tc of the multiple pixel portion forming the specific pixel portion Pc selected in S103 are averaged for each color, so that an average pixel value Tcave as the imaging pixel value Tc, which is the correction conversion source, is calculated for each color. At least one of the vanishing point Hp and the horizon line Hl serving as a reference of a selected position of the specific pixel portion Pc for averaging the imaging pixel values Tc in S103 is extracted by image processing of the camera image 33 or at a fixed position corresponding to the mounting position of the outside camera 30a.

Figure 8:
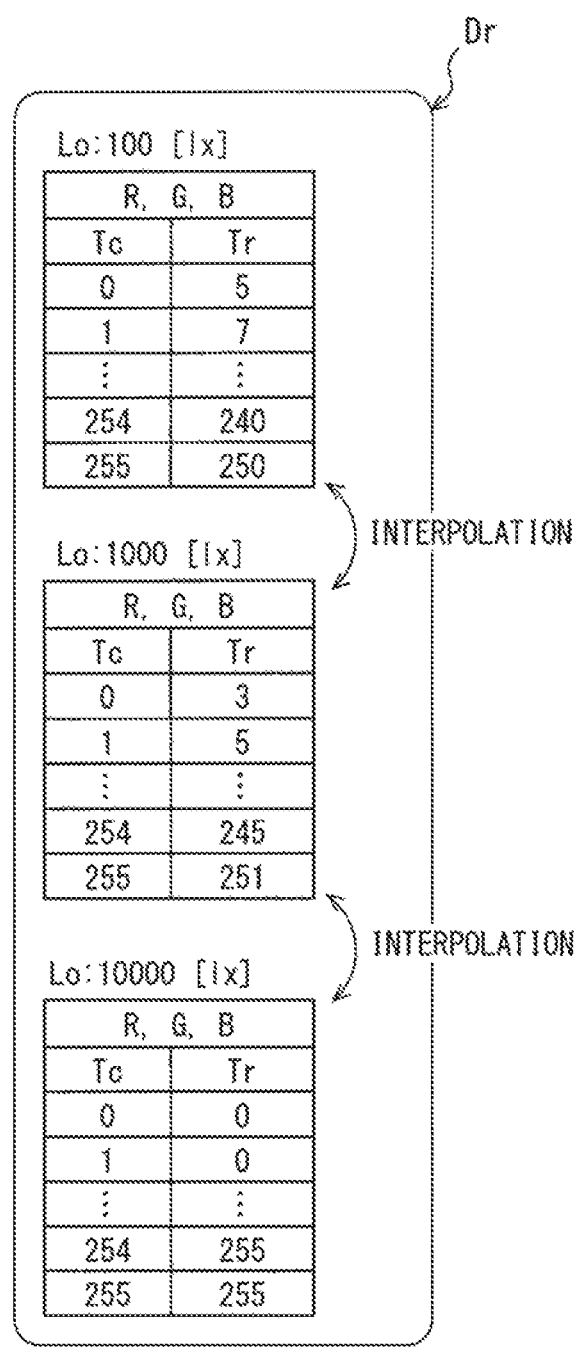
FIG. 8 is an image diagram showing correction data according to the first embodiment.

In S104, the average pixel value Tcave calculated in S103 as the imaging pixel value Tc for each color is converted into a correction pixel value Tr for each color as shown in FIG. 8 in accordance with the outside brightness Lo detected in S102. Specifically, the correction pixel value Tr represents a gradation value converted from the imaging pixel value Tc by a correction according to the outside brightness Lo in 256 gradations of 0 to 255 so that an actual outside brightness Lo can be reflected regardless of a filtering process by the outside cameras 30a or the ECU 31. Therefore, in the correction pixel value Tr according to the present embodiment, a correlation with the imaging pixel value Tc is defined for each color, and stored in advance in the memory 54b as correction data Dr. FIG. 8 shows correction data Dr which is commonly used for all colors in the present embodiment, in particular, because the correlation between the imaging pixel value Tc and the correction pixel value Tr for each color is defined to be the same.

The correction data Dr defining the correlation of the correction pixel value Tr with respect to the imaging pixel value Tc in this manner is prepared in the form of a table for each predetermined outside brightness Lo (in an example of FIG. 8, a predetermined illuminance). However, in order to reduce a storage capacity of the memory 54b, the correction data Dr between the prepared outside brightness Lo is interpolated or extrapolated from the prepared correction data Dr of the outside brightness Lo. In order to facilitate understanding of the description, FIG. 8 shows the correction data Dr indicating the correlation for each of the three outside brightness Lo and an interpolation between those outside brightness, but actually, the correction data Dr indicating the correlation for each of the outside brightness Lo and the interpolation between the outside brightness Lo, which are more finely divided, are realized. The correction data Dr may be prepared in the form of an arithmetic expression in which interpolation is unnecessary.

As described above, in S104, the correction pixel value Tr corresponding to the average pixel value Tcave calculated in S103 is determined for each of the colors based on the correction data Dr corresponding to the outside brightness Lo detected in S102.

Figure 9:
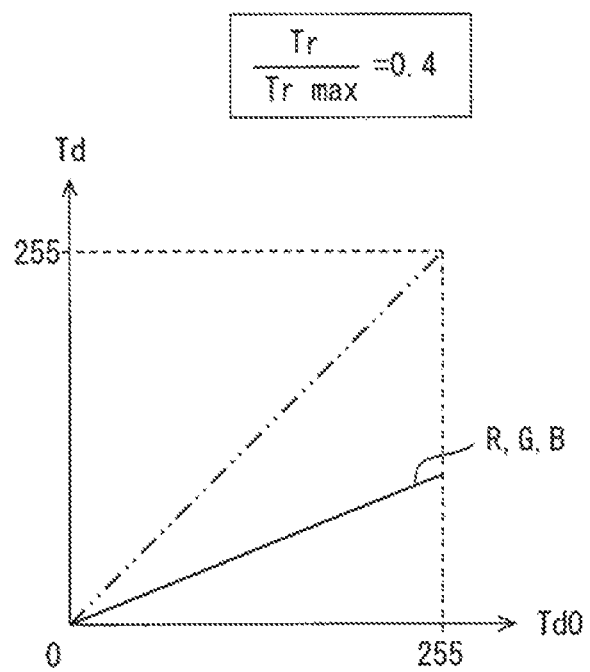
FIG. 9 is a graph showing a correlation between a display pixel value and an initial setting value according to the first embodiment.
Figure 10:
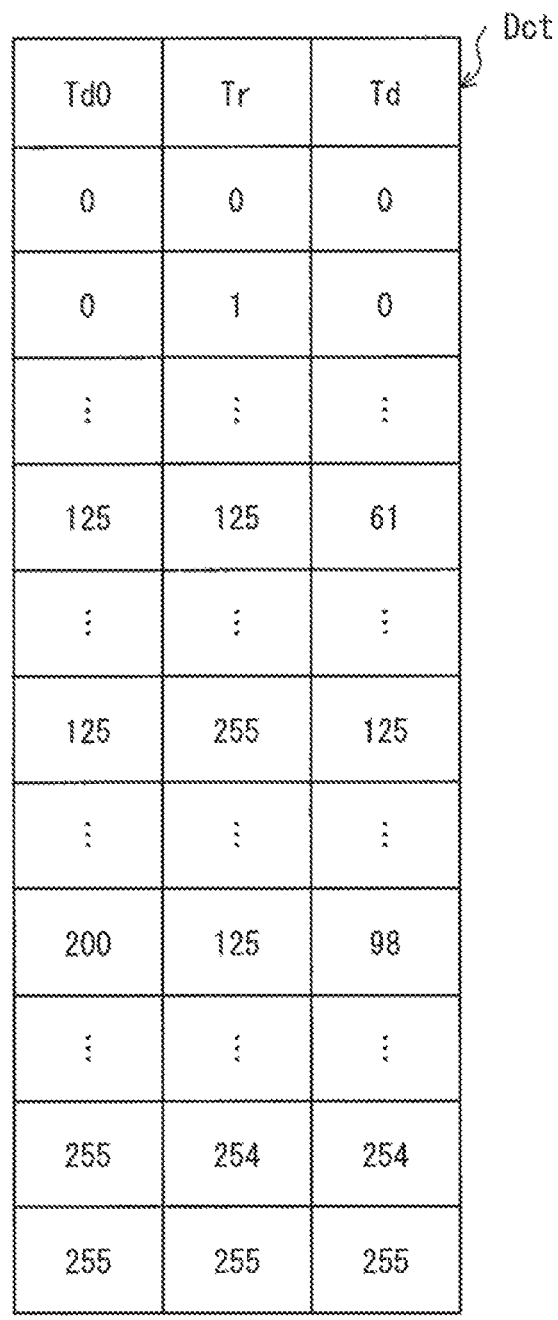
FIG. 10 is an image diagram showing pixel value control data according to the first embodiment.

Further, as shown in FIG. 7, in S105 subsequent to S104, the display pixel value Td of each pixel in the display image 56 is adjusted for each color in association with the correction pixel value Tr for each color converted in S104, individually. Specifically, the display pixel value Td of any color is expressed by the following Expression 1 with the use of an initial setting value Td0 of the display pixel value Td set in advance in the display unit 51a for each pixel of the display image 56, and the correction pixel value Tr for each color and a maximum value Trmax of the correction pixel value (in this example, 255). FIG. 9 is a solid line graph illustrating the correlation between the initial setting value Td0 and the display pixel value Td according to Expression 1, where a ratio Tr/Trmax between the correction pixel value Tr and the maximum value Trmax is 0.4. Therefore, in order to determine the display pixel value Td based on such a correlation, in the present embodiment, a pixel value control data Dct according to Expression 1 is prepared in the form of a table as shown in FIG. 10, and is stored in advance in the memory 54b. The pixel value control data Dct may be prepared in the form of an arithmetic expression representing Expression 1.

$$Td = Td0 \times Tr/Tr\max \quad \text{(Expression 1)}$$

The display pixel value Td corresponding to the correction pixel value Tr converted in S104 is determined for each of the colors in S105 based on the pixel value control data Dct stored in the memory 54b as described above. As a result, the display unit 51a is pixel-driven in accordance with the determined display pixel value Td for each color, thereby controlling the virtual image display luminance Ld of the display image 56. At that time, in the present embodiment, the light source luminance value Sd according to the light source unit 51b is maintained at a fixed value. Therefore, the virtual image display luminance Ld of the display image 56 shown in FIG. 5 is controlled corresponding to the correction pixel value Tr converted in S104 by following the determined display pixel value Td for each color. S105 described above is continued for a valid time of the correction; and when the valid time has elapsed, the process returns to S101.

From the viewpoint of the description above, in the first embodiment, the functional parts for executing the S103b of the HCU 54 correspond to an averaging block. In addition, in the first embodiment, the functional part for executing S104 of the HCU 54 corresponds to a conversion block, and the functional part for executing S105 of the HCU 54 corresponds to a display control block.

The operation and effects of the first embodiment described above will be described below.

In the first embodiment, the correction pixel value Tr converted from the imaging pixel value Tc of the camera image 33 acquired by the outside camera 30a is a value corrected based on the correction data Dr stored in the memory 54b as a correlation with the imaging pixel value Tc. At that time, since the correction pixel value Tr is converted from the imaging pixel value Tc in accordance with the outside brightness La of the outside scenery 8 detected by the brightness sensor 40a, it is easy to accurately reflect the actual outside brightness Lo. In addition, since the correction pixel value Tr is converted from the imaging pixel value Tc of the specific pixel portion imaging a near side of at least one of the vanishing point Hp and the horizon line Hl in the camera image 33, the influence of sunlight from an upper side of at least one of the vanishing point and the horizontal line can be reduced. As a result, in the display image 56 in which the virtual image display luminance Ld is controlled corresponding to the correction pixel value Tr, a contrast defect relative to the outside scenery 8 is less likely to occur, so that the visibility can be ensured.

Further, as in the first embodiment, in the imaging region Ac of the outside camera 30a including the display region Ad, the actual background of the display image 56 displayed as a virtual image in the display region Ad by the HUD 50 is imaged as the outside scenery 8. Thus, the correction pixel value Tr and the correspondingly controlled virtual image display luminance Ld can reflect such actual background imaging pixel value Tc. At the same time, as in the first embodiment, in the detection region AI of the brightness sensor 40a including the display region Ad, the outside brightness Lo is detected in the actual background of the display image 56 displayed as a virtual image in the display region Ad by the HUD 50. Thus, the correction pixel value Tr and the correspondingly controlled virtual image display luminance Ld can reflect the outside brightness La of such an actual background. Therefore, according to the reflection action as described above, the reliability of the visibility securing effect can be enhanced by making it difficult to surely cause the contrast defect.

In the first embodiment, the correction pixel value Tr is converted from the average pixel value Tcave calculated by averaging the imaging pixel values Tc of the specific pixel portion Pc which is the multiple pixel portion in the camera image 33. According to the average pixel value Tcave of the multiple pixel portion, an error caused by a local and accidental variation of the imaging pixel value Tc can be reduced. As a result, since the virtual image display luminance Ld controlled corresponding to the correction pixel value Tr is less likely to cause a contrast defect caused by such a variation error of the imaging pixel value Tc, the reliability of the visibility securing effect can be enhanced.

In addition, according to the first embodiment, the display pixel value Td is adjusted so as to correspond to the correction pixel value Tr which is converted from the imaging pixel value Tc of the specific pixel portion Pc and accurately reflects the actual outside brightness Lo. Therefore, in the display image 56, according to a virtual image display luminance Ld determined according to the display pixel value Td corresponding to the correction pixel value Tr, a contrast defect that causes a decrease in visibility can be reduced.

Second Embodiment

Figure 11:
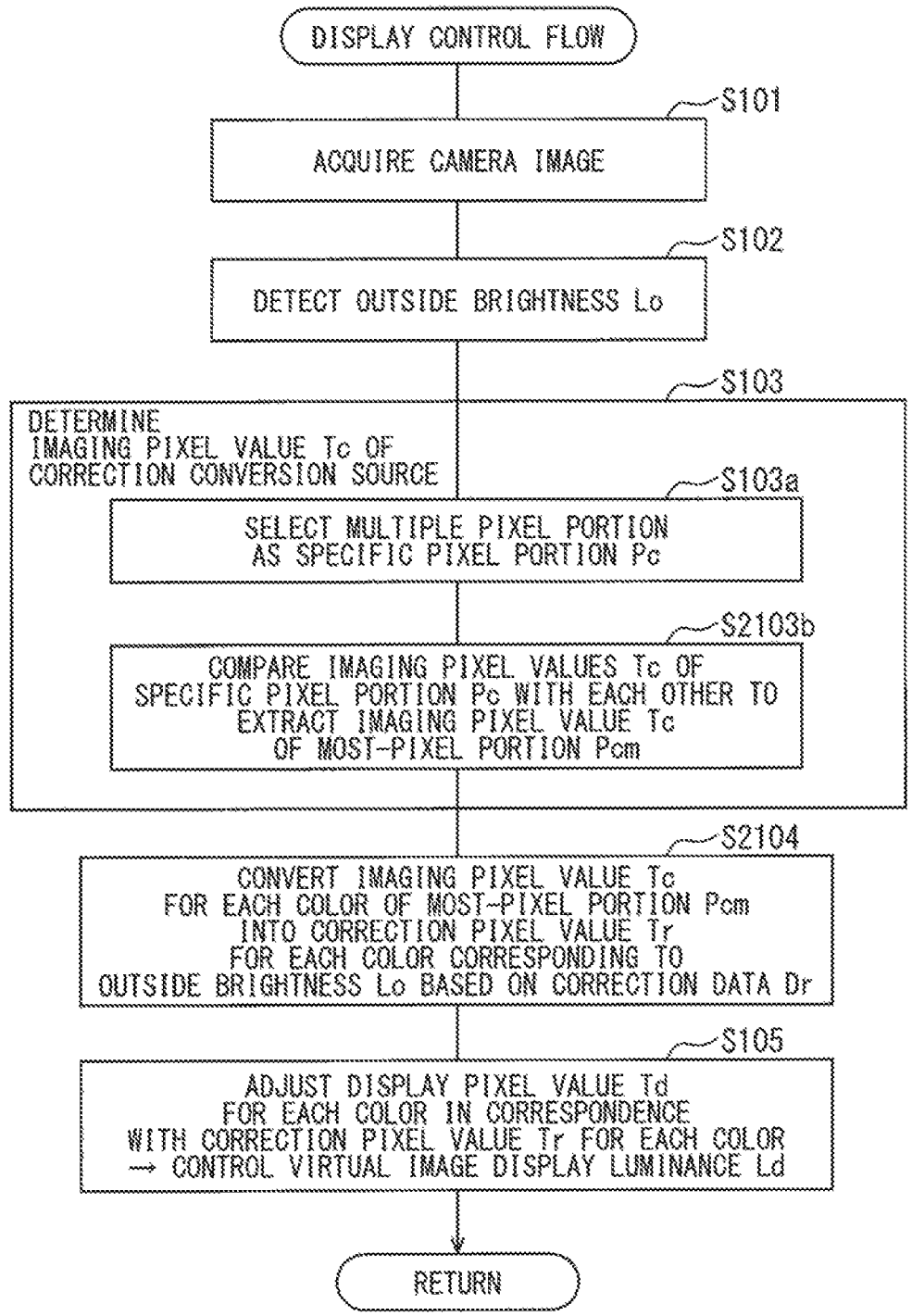
FIG. 11 is a flowchart showing a display control flow according to the second embodiment.

A second embodiment of the present disclosure is a modification of the first embodiment. As shown in FIG. 11, in S103 of a display control flow according to the second embodiment, imaging pixel values Tc of respective pixels of the multiple pixel portion forming a specific pixel portion Pc are compared with each other for each of colors in S2103*b* subsequent to S103*a*. As a result, in S2103*b*, as shown in FIG. 12, an imaging pixel value Tc of the same value or the same range is extracted for each of the colors from a most-pixel portion Pcm in which the number of pixels providing the imaging pixel value Tc of the same value or the same range is largest. In this example, FIG. 12 shows the most-pixel portion Pcm in which the number of pixels providing the imaging pixel value Tc of the same value is largest. On the other hand, although not illustrated, the imaging pixel value Tc within the same range means the same range corresponding to each imaging pixel value Tc of the specific pixel portion Pc in multiple ranges that are separated from each other in advance every time the imaging pixel value Tc increases by a set amount.

As shown in FIG. 11, in the second embodiment, S103 shifts to S2104. In S2104, the imaging pixel value Tc for each color of the most-pixel portion extracted in S2103*b* is converted into a correction pixel value Tr for each color in accordance with an outside brightness Lo detected in S102. The conversion at that time is executed according to the first embodiment. In other words, the correction pixel value Tr corresponding to the imaging pixel value Tc of the most-pixel portion Pcm extracted in S2103*b* is determined for each of the colors based on the correction data Dr corresponding to the outside brightness Lo detected in S102.

According to the second embodiment described above, the functional part for executing S2103*b* of the HCU 54 corresponds to an extraction block. In addition, in the second embodiment, the functional part for executing S2104 of the HCU 54 corresponds to a conversion block.

As described above, in the second embodiment, the imaging pixel values Tc of the specific pixel portion Pc which is the multiple pixel portion in the camera image 33 are compared with each other, so that the correction pixel value Tr is converted from the imaging pixel value Tc of the most-pixel portion Pcm in which the number of pixels providing the imaging pixel value Tc having the same value or within the same range is the largest. According to the imaging pixel value Tc of the most-pixel portion Pcm, an error due to local and accidental fluctuation of the imaging pixel value Tc can be reduced. As a result, since the virtual image display luminance Ld controlled corresponding to the correction pixel value Tr is less likely to cause a contrast defect caused by such a variation error of the imaging pixel value Tc, the reliability of the visibility securing effect can be enhanced.

Third Embodiment

Figure 13:
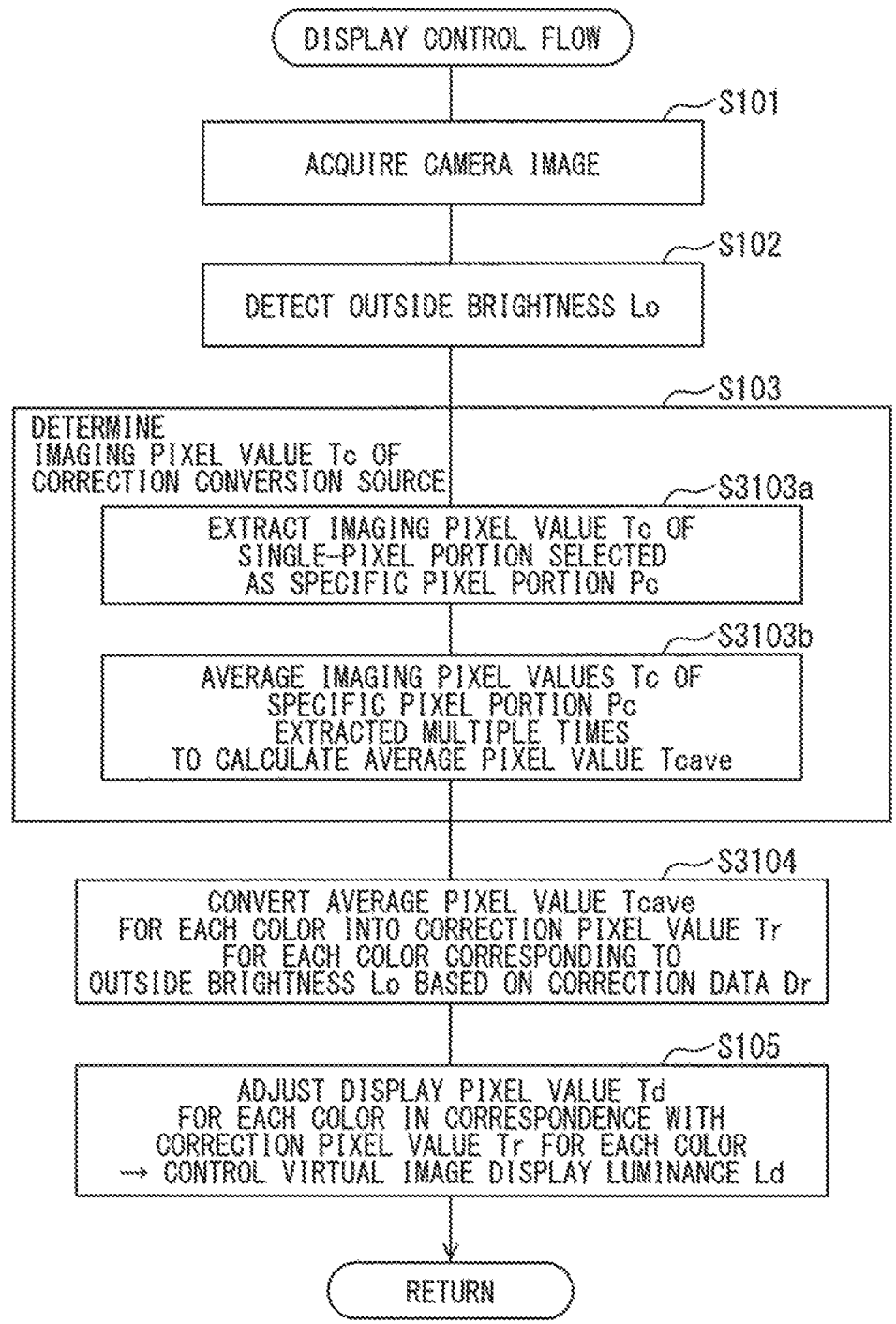
FIG. 13 is a flowchart showing a display control flow according to a third embodiment.

A third embodiment of the present disclosure is a modification of the first embodiment. As shown in FIG. 13, in S103 of a display control flow according to the third embodiment, S3103*a* and S3103*b* are executed.

Figure 14:
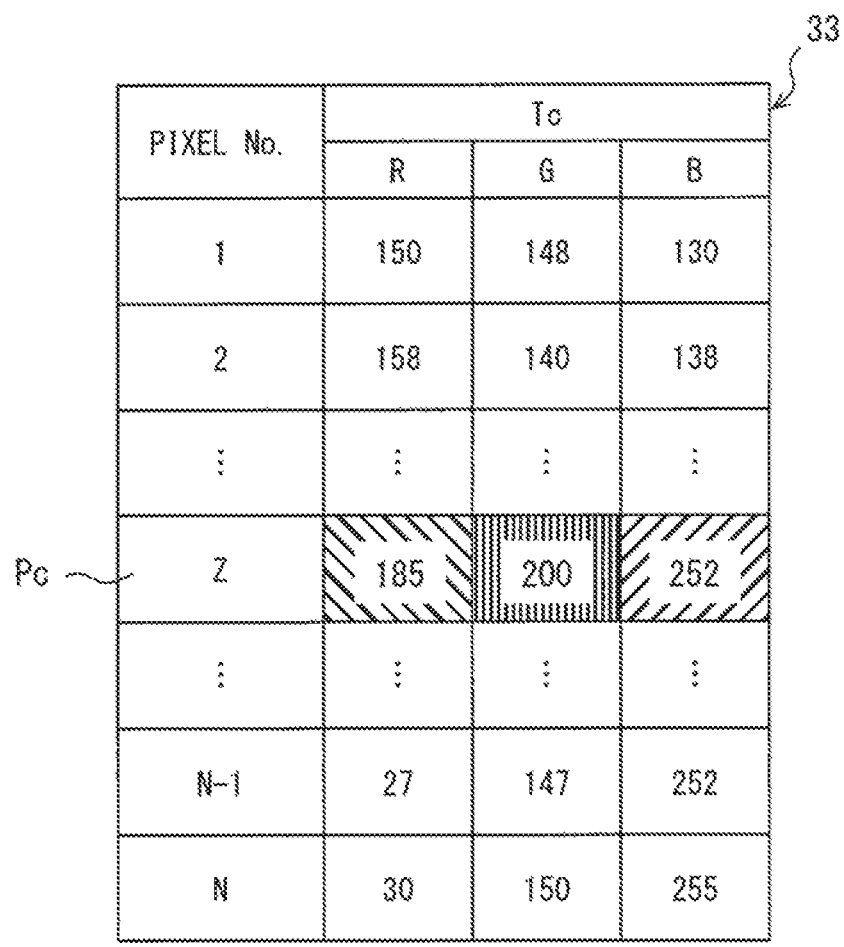
FIG. 14 is an image diagram showing an imaging pixel value of a camera image according to the third embodiment.

First, in S3103*a*, a single-pixel portion obtained by capturing an image of a portion overlapping with a display region Ad is selected as a specific pixel portion Pc in a camera image 33 shown in FIG. 14, limited to an outside scenery 8 on a near side of at least one of a vanishing point Hp and a horizon line Hl. At that time, in the third embodiment, a fixed single-pixel portion set in advance as shown in FIG. 14 is selected as the specific pixel portion Pc. At that time, in the third embodiment, the imaging pixel value Tc of the single-pixel portion forming the selected specific pixel portion Pc is extracted for each color and stored in a memory 54*b*. The single-pixel portion as the specific pixel portion Pc is fixed to, for example, a pixel corresponding to the center of the display region Ad in the camera image 33.

Next, as shown in FIG. 13, in S3103*b*, the imaging pixel values Tc extracted in S3103*a* multiple times and stored in the memory 54*b* for each color, the average pixel value Tcave to be a correction conversion source is calculated for each color. At that time, the number of times of use of the imaging pixel value Tc in the calculation of the average pixel value Tcave is set to a value capable of reducing an error due to a local and accidental variation of the imaging pixel value Tc. For that reason, while the number of times of extracting the imaging pixel value Tc in S3103*a* becomes smaller than the number of times of using the imaging pixel value Tc in S3103*b* from a start of the display control flow in response to on-operation of a power switch 41*a*, the display control flow returns to S101 without executing S3103*b* and subsequent steps, although illustration is omitted.

In the third embodiment, the process shifts from S103 described above to S3104. In S3104, the average pixel value Tcave for each color calculated in S3103*b* is converted into the correction pixel value Tr for each color in accordance with the outside brightness Lo detected in S102. The conversion at that time is executed according to the first embodiment. In other words, the correction pixel value Tr corresponding to the average pixel value Tcave calculated in S3103*b* is determined for each of the colors based on the correction data Dr corresponding to the outside brightness Lo detected in S102.

In the third embodiment described above, the functional part for executing S3103*a* of the HCU 54 corresponds to an extraction block, and the functional part for executing the S3103*b* of the HCU 54 corresponds to an averaging block. In addition, in the third embodiment, the functional part for executing S3104 of the HCU 54 corresponds to a conversion block.

As described above, in the third embodiment, the correction pixel value Tr is converted from the average pixel value Tcave calculated by extracting the imaging pixel values Tc of the specific pixel portion Pc which is a single-pixel portion of the camera image 33a multiple times and averaging the imaging pixel values Tc. According to the average pixel value Tcave extracted multiple times, an error caused by the local and accidental variation in the imaging pixel value Tc can be reduced. As a result, since the virtual image display luminance Ld controlled corresponding to the correction pixel value Tr is less likely to cause a contrast defect caused by such a variation error of the imaging pixel value Tc, the reliability of the visibility securing effect can be enhanced.

Fourth Embodiment

Figure 15:
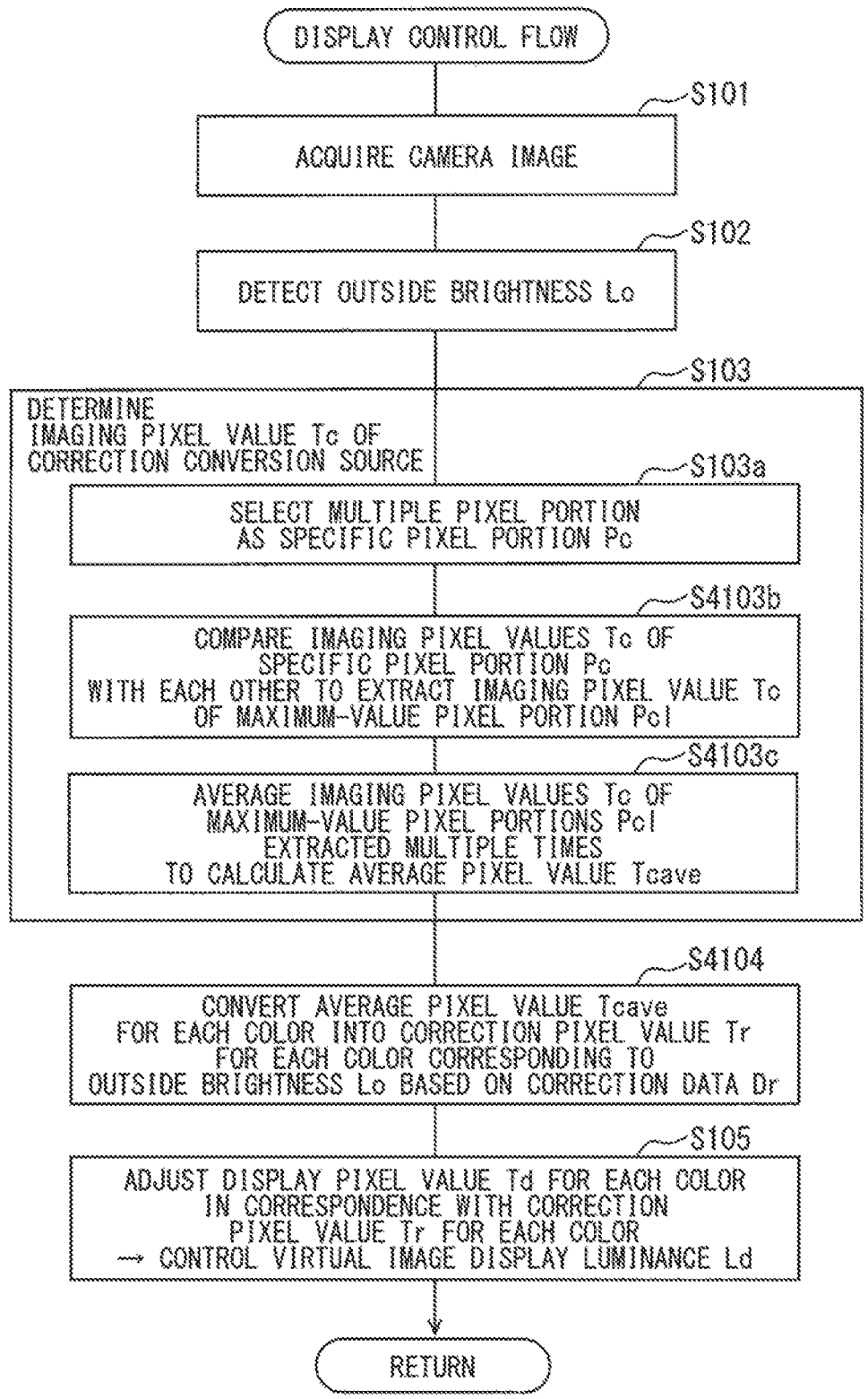
FIG. 15 is a flowchart showing a display control flow according to a fourth embodiment.

A fourth embodiment of the present disclosure is a modification of the first embodiment. As shown in FIG. 15, in S103 of a display control flow according to the fourth embodiment, imaging pixel values Tc of the respective pixels of the multiple pixel portion forming a specific pixel portion Pc are compared with each other for each of the colors in S4103b subsequent to S103a. As a result, in S4103b, as shown in FIG. 16, the maximum imaging pixel value Tc of a maximum-value pixel portion Pd which gives the maximum imaging pixel value Tc for each of the colors is extracted. At that time, in the fourth embodiment, the extracted imaging pixel value Tc for each color is stored in a memory 54b.

In S103 of the display control flow according to the fourth embodiment, the display control flow shifts from S4103b to S4103c as shown in FIG. 15. In S4103c, the imaging pixel values Tc of the maximum-value pixel portions Pcl extracted in S4103b multiple times and stored in the memory 54b are averaged for each color, so that the average pixel value Tcave to be a correction conversion source is calculated for each color. At that time, the number of times of use of the imaging pixel value Tc in the calculation of the average pixel value Tcave is set to a value capable of reducing an error due to a local and accidental variation of the imaging pixel value Tc. For that reason, while the number of times of extracting the imaging pixel value Tc in S4103b becomes smaller than the number of times of using the imaging pixel value Tc in S4103c from a start of the display control flow in response to on-operation of a power switch 41a, the display control flow returns to S101 without executing S4103c and subsequent steps, although illustration is omitted.

In the fourth embodiment, the process shifts from S103 to S4104. In S4104, the average pixel value Tcave for each color calculated in S4103c is converted into the correction pixel value Tr for each color in accordance with the outside brightness Lo detected in S102. The conversion at that time is executed according to the first embodiment. In other words, the correction pixel value Tr corresponding to the average pixel value Tcave calculated in S4103c is determined for each of the colors based on the correction data Dr corresponding to the outside brightness La detected in S102.

In the fourth embodiment described above, the functional part for executing S4103b of the HCU 54 corresponds to an extraction block, and the functional part for executing the S4103c of the HCU 54 corresponds to an averaging block. In addition, in the fourth embodiment, the functional part for executing the S4104 of the HCU 54 corresponds to a conversion block.

As described above, in the fourth embodiment, the imaging pixel value Tc of the specific pixel portion Pc which is the multiple pixel portion in the camera image 33 is compared with each other to extract the imaging pixel value Tc of the maximum-value pixel portion Pcl which gives the maximum imaging pixel value Tc. Therefore, the correction pixel value Tr is converted from the average pixel value Tcave calculated by extracting the imaging pixel values Tc of the maximum-value pixel portion Pcl multiple times and averaging the imaging pixel values Tc. According to the average pixel value Tcave extracted multiple times, an error caused by the local and accidental variation in the imaging pixel value Tc can be reduced. As a result, since the virtual image display luminance Ld controlled corresponding to the correction pixel value Tr is less likely to cause a contrast defect caused by such a variation error of the imaging pixel value Tc, the reliability of the visibility securing effect can be enhanced.

Fifth Embodiment

Figure 17:
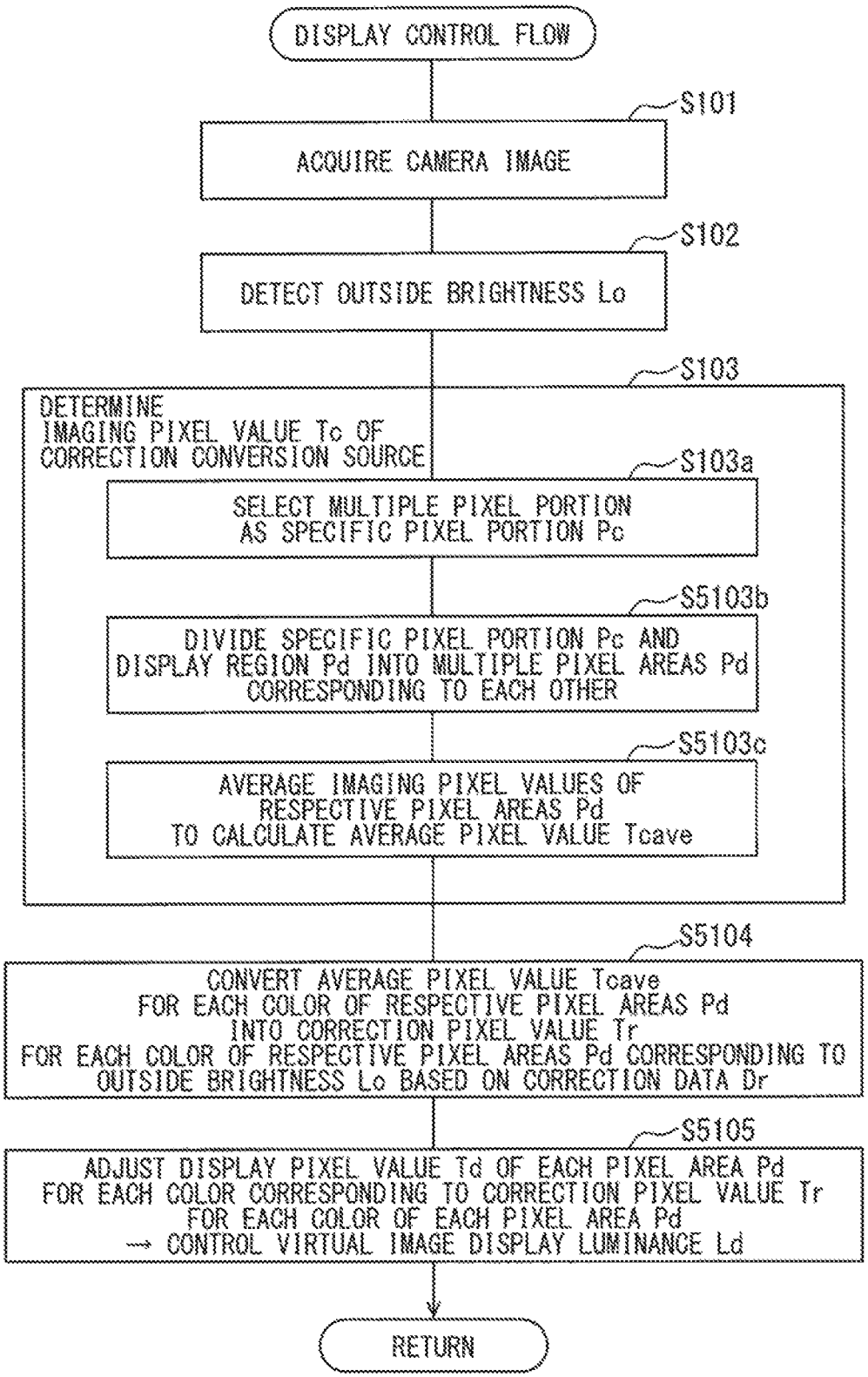
FIG. 17 is a flowchart showing a display control flow according to a fifth embodiment.
Figure 18:
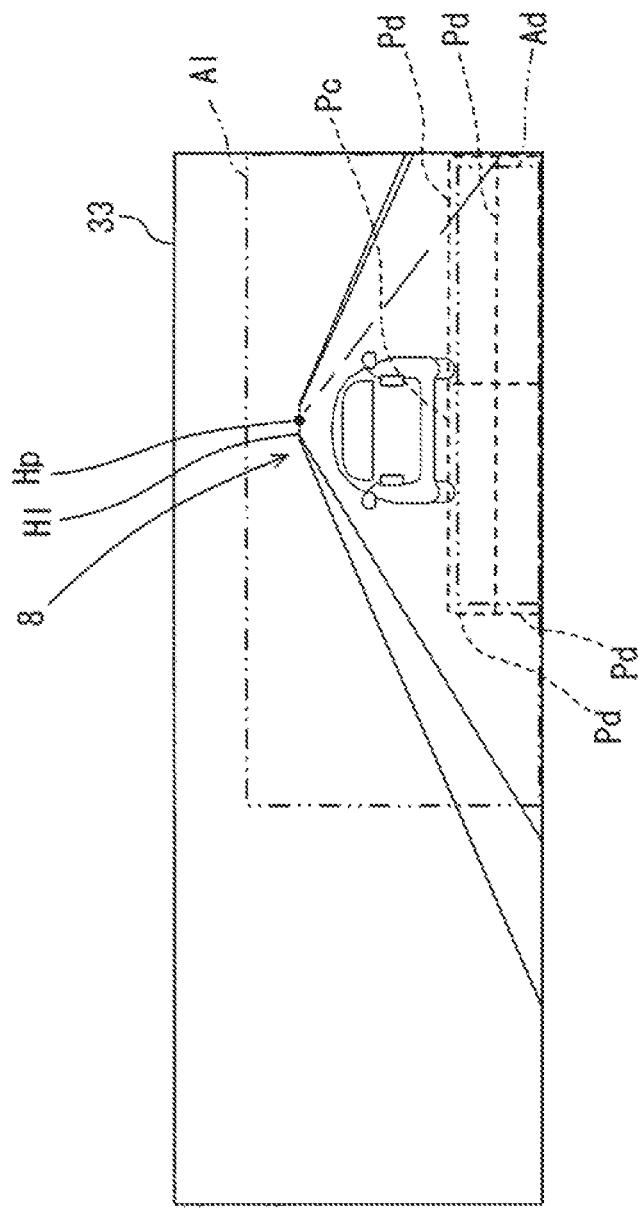
FIG. 18 is an image diagram showing a camera image according to the fifth embodiment.
Figure 19:
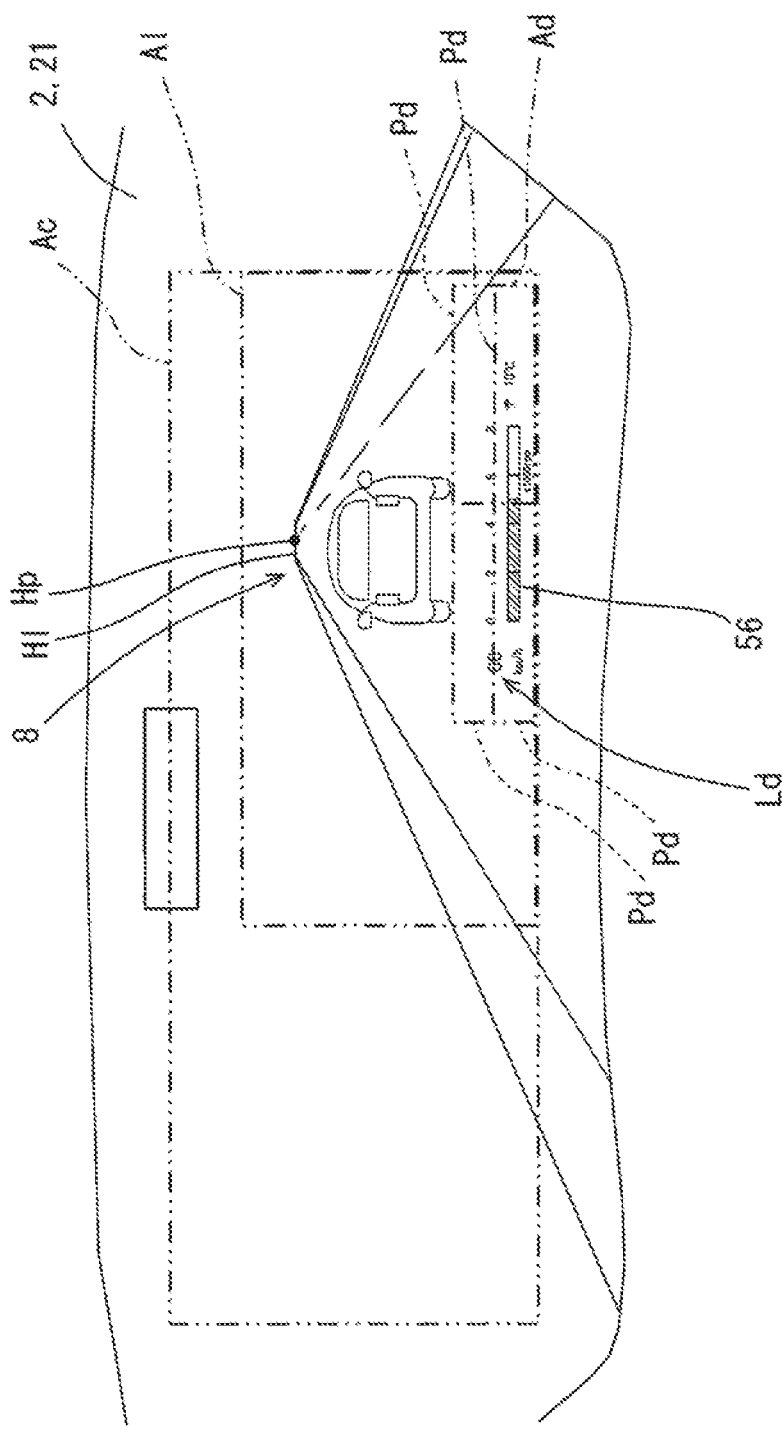
FIG. 19 is a front view showing a virtual image display state of a display image according to the fifth embodiment.

A fifth embodiment of the present disclosure is a modification of the first embodiment. As shown in FIG. 17, in S103 of a display control flow according to the fifth embodiment, in S5103b subsequent to S103a, a specific pixel portion Pc of the camera image 33 shown in FIG. 18 and a display region Ad shown in FIG. 19 are divided into multiple pixel areas Pd corresponding to each other. At that time, in an example of FIGS. 18 and 19, the specific pixel portion Pc and the display region Ad are divided so that the pixel areas Pd are arranged two by two in vertical and horizontal directions with each of multiple pixel portions continuous in the vertical and horizontal directions as one pixel area Pd.

In S103 of the display control flow according to the fifth embodiment, the display control flow shifts from S5103b to S5103c as shown in FIG. 17. In S5103c, the imaging pixel value Tc of each pixel in the camera image 33 divided in S5103c is averaged for each color of each pixel area Pd, so that an average pixel value Tcave serving as the correction conversion source is calculated for each color of each pixel area Pd.

In the fifth embodiment, the process shifts from S103 to S5104. In S5104, the average pixel value Tcave for each color of each pixel area Pd calculated in S5103c is converted into the correction pixel value Tr for each color of each pixel area Pd in accordance with the outside brightness Lo detected in S102. The conversion at that time is executed according to the first embodiment. In other words, the correction pixel value Tr corresponding to the average pixel value Tcave calculated in S5103c is determined for each of the colors of each pixel area Pd based on the correction data Dr corresponding to the outside brightness Lo detected in S102.

Further, in the fifth embodiment, the process shifts from S5104 to S5105, so that the display pixel value Td of each pixel of each pixel area Pd in the display image 56 is adjusted for each color in association with the correction pixel value Tr for each color of each pixel area Pd converted in S5104, individually. The adjustment at that time is executed according to the first embodiment. In other words, the display pixel values Td corresponding to the correction pixel values Tr of the pixel areas Pd converted in S5104 are determined for each of the colors on the basis of a pixel value control data Dct stored in the memory 54b. At that time, a light source luminance value Sd of a light source unit 51b is maintained at a fixed value according to the first embodiment. As a result, a virtual image display luminance Ld of the display image 56 in each pixel area Pd follows the determined display pixel value Td, whereby the virtual image display luminance Ld is controlled individually corresponding to the correction pixel value Tr in each pixel area Pd converted in S5104. It should be noted that S5105 is continued fora valid time of the correction, and when the valid time has elapsed, the process returns to S101.

In the fifth embodiment described above, the functional part for executing S5103b of the HCU 54 corresponds to a division block, and the functional portion for executing S5103c of the HCU 54 corresponds to an averaging block. In addition, in the fifth embodiment, the functional part for executing S5104 of the HCU 54 corresponds to a conversion block, and the functional part for executing S5105 of the HCU 54 corresponds to a display control block.

As described above, in the fifth embodiment, the correction pixel value Tr of each pixel area Pd is converted from the average pixel value Tcave as the imaging pixel value Tc of each pixel area Pd divided into the multiple pixels in the specific pixel portion Pc of the camera image 33. According to the above configuration, in each pixel area Pd of the display region Ad divided in correspondence with the camera image 33, the virtual image display luminance Ld corresponding to the correction pixel value Tr accurately reflecting an actual outside brightness Lo can be individually controlled to a value for reducing the contrast defect. Therefore, the effect of ensuring visibility itself can be improved.

Sixth Embodiment

Figure 20:
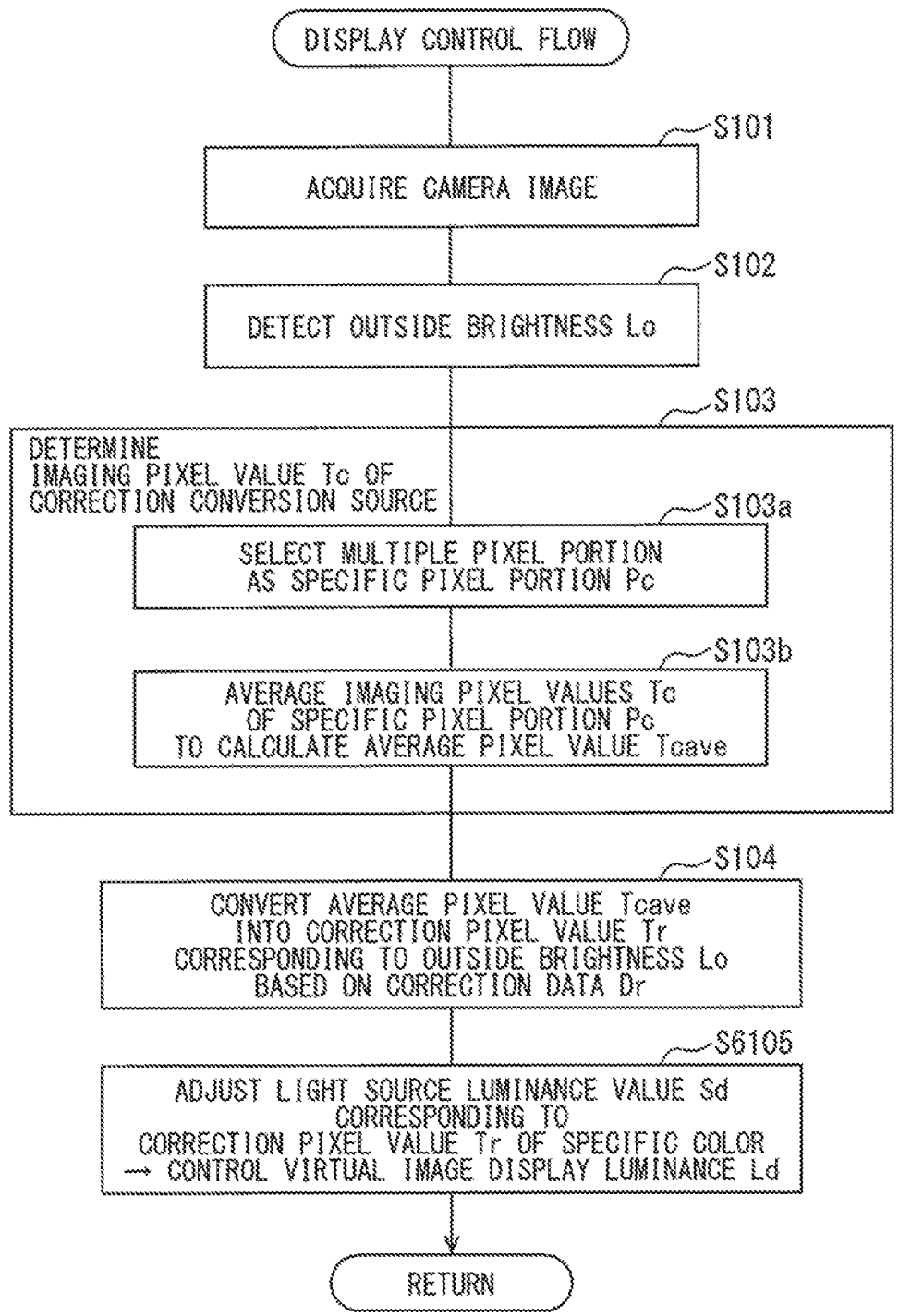
FIG. 20 is a flowchart showing a display control flow according to a sixth embodiment.

A sixth embodiment of the present disclosure is a modification of the first embodiment. As shown in FIG. 20, in S6105 of a display control flow according to the sixth embodiment, a light source luminance value Sd of a light source unit 51b is adjusted in association with a correction pixel value Tr of a specific color among correction pixel values Tr for each color converted in S104. In S104 of the sixth embodiment, only the specific color is converted into the correction pixel value Tr, and in S6105, the light source luminance value Sd may be adjusted so as to correspond to the converted correction pixel value Tr of the specific color. In this example, the specific color is set in advance to the color G in the sixth embodiment, but may be set in advance to another color R or B.

Figure 21:
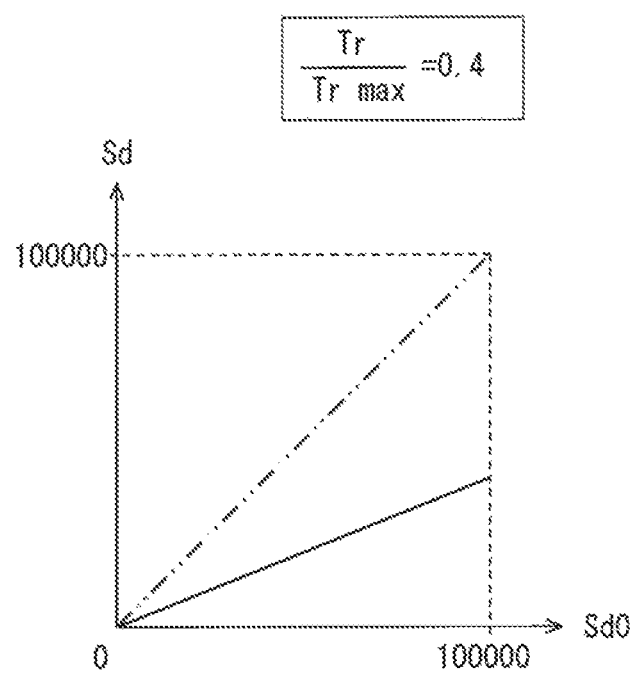
FIG. 21 is a graph showing a correlation between a display pixel value and an initial setting value according to the sixth embodiment.
Figure 22:
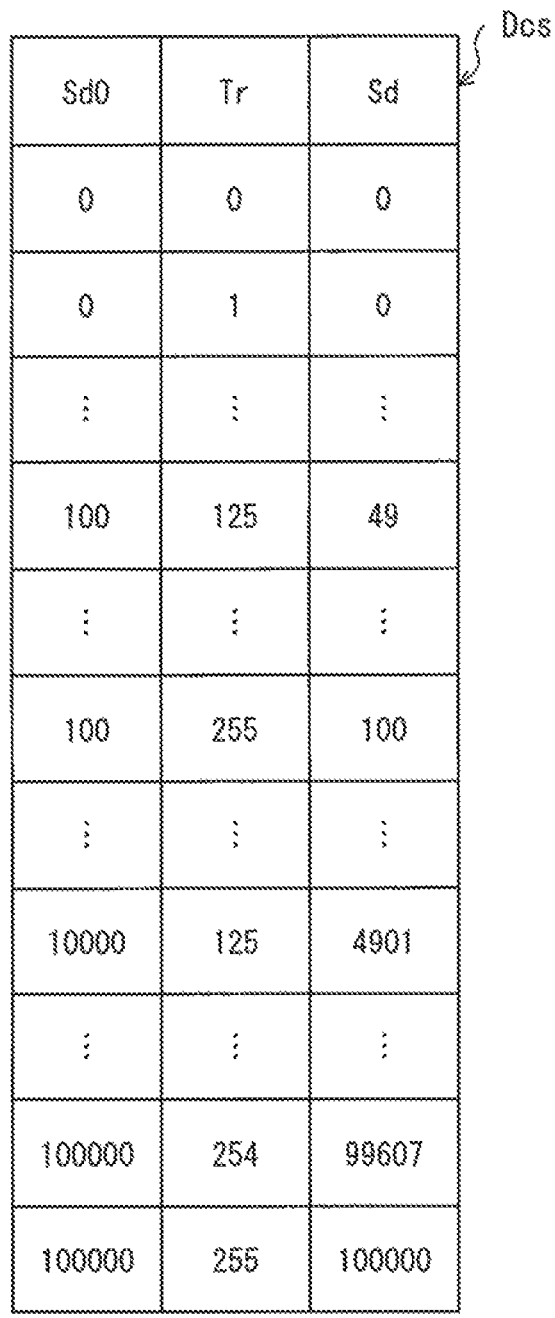
FIG. 22 is an image diagram showing luminance value control data according to the sixth embodiment.

Specifically, the light source luminance value Sd is expressed by Expression 2 below with the use of an initial setting value Sd0 of the light source luminance value Sd set in advance in the light source unit 51b and the correction pixel value Tr of a specific color and the maximum value Trmax of the correction pixel value Tr. FIG. 21 is a solid-line graph illustrating a correlation between the initial setting value Sd0 and the light source luminance value Sd according to Expression 2, where a ratio Tr/Trmax between the correction pixel value Tr and the maximum value Trmax is 0.4. Therefore, in order to determine the light source luminance value Sd based on such a correlation, in the sixth embodiment, luminance value control data Dcs according to Expression 2 is prepared in the form of a table as shown in FIG. 22, and is stored in advance in a memory 54b. The luminance value control data Dcs may be prepared in the form of an arithmetic expression expressing Expression 2.

$$Sd = Sd0 \times Tr/Tr\max \quad \text{(Expression 2)}$$

In this manner, in S6105, the light source luminance value Sd corresponding to the correction pixel value Tr of the specific color converted in S104 is determined based on the luminance value control data Dcs stored in the memory 54b. At that time, in the sixth embodiment, the display pixel value Td according to the display unit 51a is maintained and set to a fixed value. Therefore, the virtual image display luminance Ld of the display image 56 is controlled corresponding to the correction pixel value Tr converted in S104 by following the determined light source luminance value Sd. It should be noted that S6105 is continued for a valid time of the correction, and when the valid time has elapsed, the process returns to S101.

In the sixth embodiment, the functional part for executing S6105 of the HCU 54 corresponds to a display control block.

As described above, in the sixth embodiment, the light source luminance value Sd is adjusted so as to correspond to the correction pixel value Tr which is converted from the imaging pixel value Tc of the specific pixel portion Pc and accurately reflects an actual outside brightness Lo. Therefore, in the display image 56, according to the virtual image display luminance Ld determined according to the light source luminance value Sd corresponding to the correction pixel value Tr, a contrast defect that causes a decrease in visibility can be reduced.

Seventh Embodiment

Figure 23:
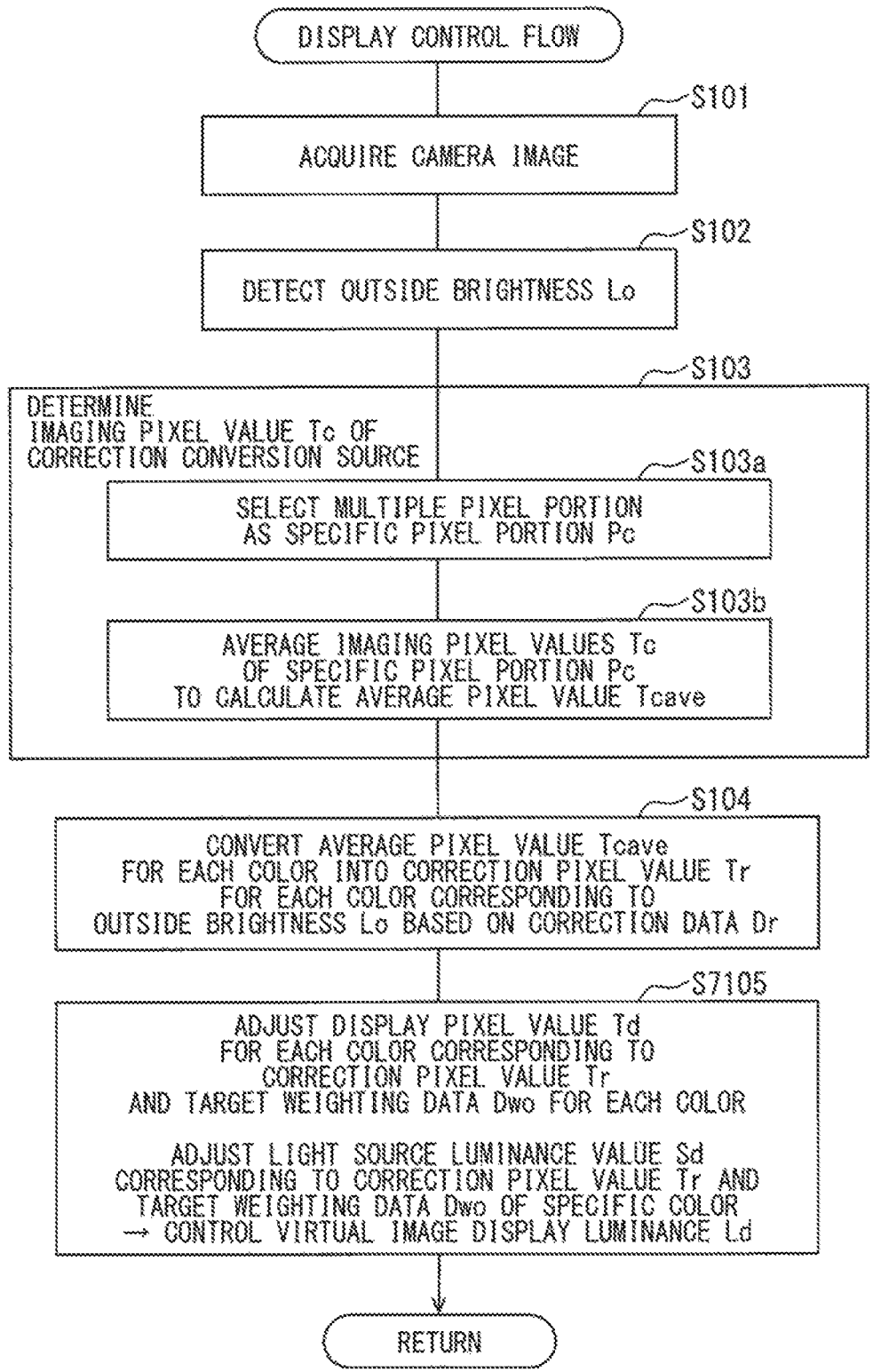
FIG. 23 is a flowchart showing a display control flow according to a seventh embodiment.

A seventh embodiment of the present disclosure is a modification of the first embodiment. As shown in FIG. 23, in S7105 of a display control flow according to the seventh embodiment, a display pixel value Td of each pixel for each of colors in the display image 56 is controlled so as to individually correspond to the correction pixel value Tr of each color converted in S104, and also so as to correspond to target weighting data two. At the same time, in S7105, the light source luminance value Sd of the light source unit 51b is controlled so as to correspond to the correction pixel value Tr of a specific color among the correction pixel values Tr for each color converted in S104 and also so as to correspond to the target weighting data Dwo. In the seventh embodiment, the specific color is set in advance to the color G, but may be set in advance to another color R or B.

Specifically, the target weighting data Dwo is a numerical value for weighting the correction on the display pixel value Td rather than the light source luminance value Sd. Therefore, the target weighting data Dwo is set and stored in advance in the memory 54b such that the value for weighting the display pixel value Td is larger than the value for weighting the light source luminance value Sd and a sum of those values is set to 1. For example, the target weighting data Dwo is set to 0.25 or the like smaller than 0.5 in the case of the light source luminance value Sd, and to 0.75 or the like larger than 0.5 in the case of the display pixel value Td.

Figure 24A:
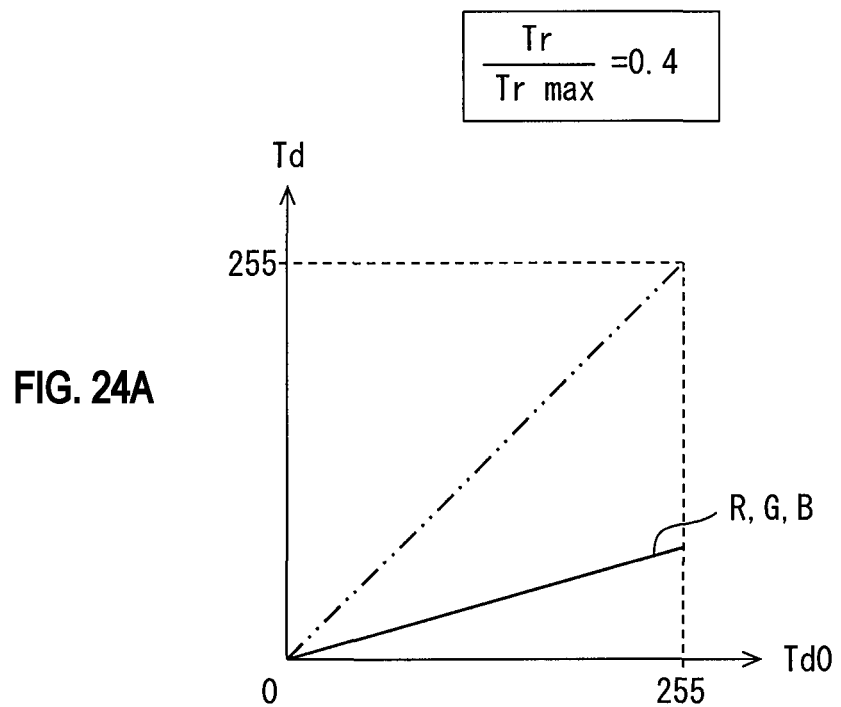
FIG. 24A is a graph showing a correlation between a display pixel value and an initial setting value according to the seventh embodiment.

The display pixel value Td for each color is represented by Expression 3 below with the use of the target weighting data Dwo, the initial setting value Td0 of the display pixel value Td, and the correction pixel value Tr for each color and the maximum value Trmax of the correction pixel value Tr. FIG. 24A is a solid line graph illustrating the correlation between the initial setting value Td0 and the display pixel value Td according to Expression 3, where a ratio Tr/Trmax between the correction pixel value Tr and the maximum value Trmax is 0.4. Therefore, in order to determine the display pixel value Td based on such a correlation, in the seventh embodiment, a pixel value control data Dct according to Expression 3 is prepared in the form of a table as shown in FIG. 25A, and is stored in advance in the memory 54b. The pixel value control data Dct may be prepared in the form of an arithmetic expression representing Expression 3.

$$Td = Dwo \times Td0 \times Tr/Tr\max \quad \text{(Expression 3)}$$

Figure 24B:
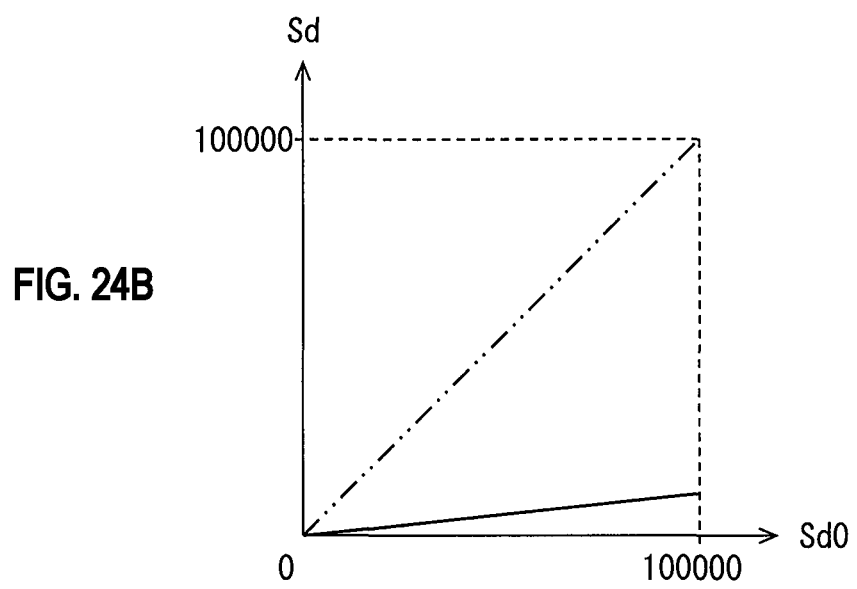
FIG. 24B is a graph showing a correlation between a light source luminance value and the initial setting value according to the seventh embodiment.

On the other hand, the light source luminance value Sd is expressed by Expression 4 below with the use of the target weighting data Dwo, an initial setting value Sd0 of the light source luminance value Sd set in advance in the light source unit 51b and the correction pixel value Tr of a specific color and the maximum value Trmax of the correction pixel value Tr. FIG. 24B is a solid-line graph illustrating a correlation between the initial setting value Sd0 and the light source luminance value Sd according to Expression 4, where a ratio Tr/Trmax between the correction pixel value Tr and the maximum value Trmax is 0.4. Therefore, in order to determine the light source luminance value Sd based on such a correlation, in the seventh embodiment, luminance value control data Dcs according to Expression 4 is prepared in the form of a table as shown in FIG. 25B, and is stored in advance in a memory 54b. The luminance value control data Dcs may be prepared in the form of an arithmetic expression expressing Expression 4.

$$Sd = Dwo \times Sd0 \times Tr/Tr\max \quad \text{(Expression 4)}$$

In the seventh embodiment, in S7105, the display pixel value Td for each color corresponding to not only the correction pixel value Tr for each color converted in S104 but also the target weighting data Dwo in the pixel value control data Dct is determined based on the pixel value control data Dct stored in the memory 54b. At the same time, in S7105, the light source luminance value Sd corresponding to not only the correction pixel value Tr of the specific color converted in S104 but also the target weighting data Dwo in the luminance value control data Dcs is determined based on the luminance value control data Dcs stored in the memory 54b. As a result, the virtual image display luminance Ld of the display image 56 is controlled corresponding to the correction pixel value Tr converted in S104 by following the determined display pixel value Td and the determined light source luminance value Sd for each of the colors. It should be noted that S7105 is continued fora valid time of the correction, and when the valid time has elapsed, the process returns to S101.

In the seventh embodiment, the functional part for executing S7105 of the HCU 54 corresponds to a display control block.

As described above, in the seventh embodiment, the display pixel value Td and the light source luminance value Sd are adjusted so as to correspond to the correction pixel value Tr which is converted from the imaging pixel value Tc of the specific pixel portion Pc and accurately reflects an actual outside brightness Lo. At that time, according to the target weighting data Dwo to which those adjustment targets are made to correspond, the former, which is one of the display pixel value Td and the light source luminance value Sd, is given a correction weight more than that of the latter, which is the other. According to the above configuration, with the combination of one priority adjustment target with the other auxiliary adjustment target, the resolution of the virtual image display luminance Ld can be finely set to reduce the contrast defect, so that the reliability of the visibility securing effect can be enhanced.

Other Embodiments

Although a plurality of embodiments of the present disclosure have been described above, the present disclosure is not construed as being limited to these embodiments, and can be applied to various embodiments and combinations within a scope without departing from the spirit of the present disclosure.

In Modification 1 relating to the first to seventh embodiments, in addition to or instead of the HCU 54, at least a part of the display control flows may be realized functionally (that is, in a software-like manner) by the cooperation of one or more types of an ECU for controlling other display elements of the vehicle 2 and the ECUs 31, 42. In Modification 2 relating to the first to seventh embodiments, at least a part of the display control flow may be realized by hardware using one or multiple ICs or the like, instead of the display control flow being realized functionally by using the HCU 54 or the like.

In Modification 3 relating to the first to seventh embodiments, the storage of the display image 56 may be realized by a memory built in the HUD 50 or another display element of the vehicle 2, or by a cooperation of the built-in memory and the memory 54b. In Modification 4 relating to the first to seventh embodiments, at least one type of data among the data Dr, Dct, Dwc, Dwo, and Dcs may be realized by a memory built in the HUD 50 or another display element of the vehicle 2, or by a cooperation of the built-in memory and the memory 54b.

In Modification 5 relating to the first to seventh embodiments, for example, a pixel portion that changes in accordance with a time, a vehicle speed, or the like may be selected as the specific pixel portion Pc. In Modifications 6 relating to the first, second, and fourth to seventh embodiments, a predetermined number of discontinuous pixel portions in the pixel portion continuous in the vertical and horizontal directions may be selected as the specific pixel portion Pc or the pixel area Pd.

In Modification 7 related to the first to seventh embodiments, a pixel portion of the camera image 33, which includes the vanishing point Hp in the outside scenery 8 (that is, extending vertically), may be selected as the specific pixel portion Pc. In Modification 8 relating to the first to seventh embodiments, a pixel portion of the camera image 33 in which a portion including the horizon line HI (that is, extending vertically) in the outside scenery 8 is imaged may be selected as the specific pixel portion Pc.

In Modification 9 relating to the first to seventh embodiments, a part or the whole of the display region Ad may be deviated from the imaging region Ac of the outside camera 30a. In Modification 9, the imaging region Ac may be set in addition to the front of the vehicle compartment 2a. In Modification 10 relating to the first to seventh embodiments, a part or the whole of the display region Ad may be out of the detection region AI of the brightness sensor 40a. In Modification 10, the detection region AI may be set at a position other than the front of the vehicle compartment 2a.

Figures 26, 27:
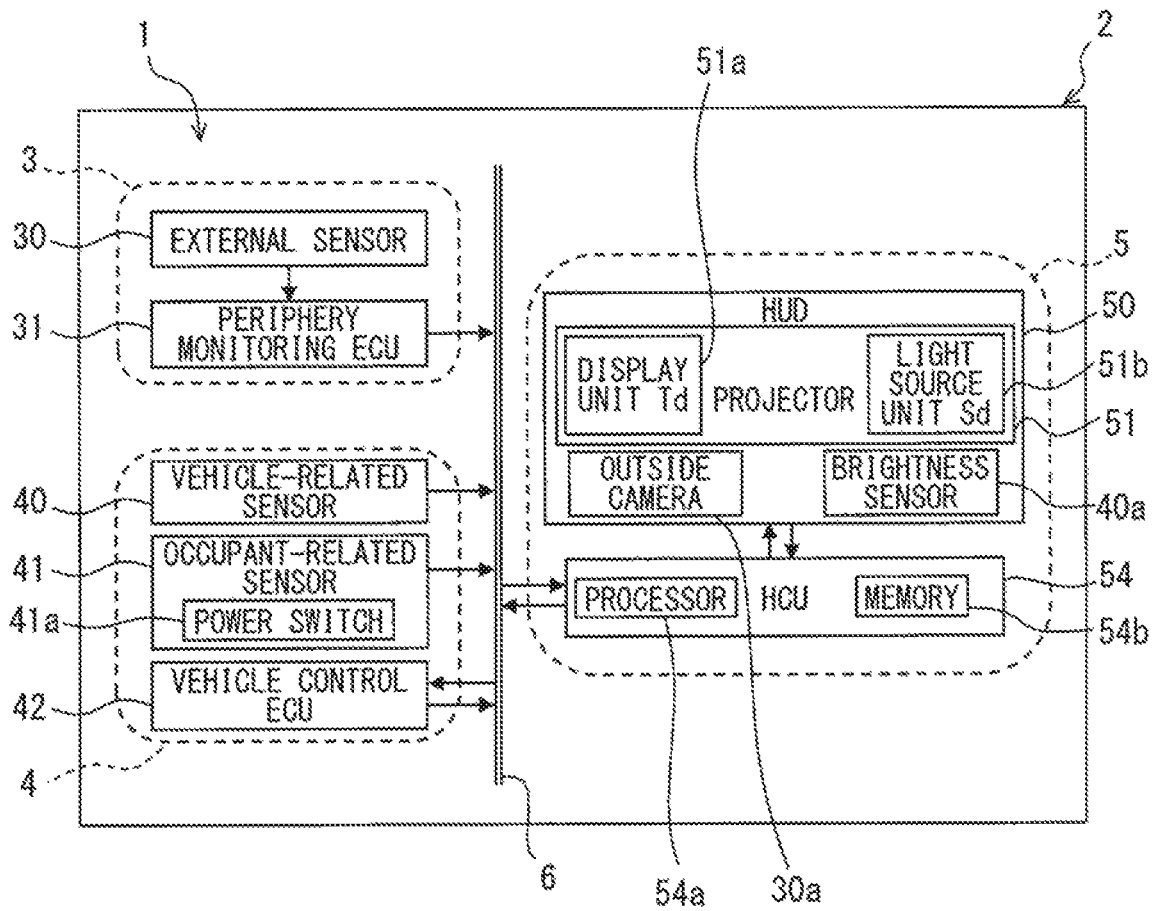
FIG. 26 is a block diagram showing a vehicle display device according to a modification of FIG. 2.
FIG. 27 is an image diagram showing an imaging pixel value of a camera image according to a modification of FIG. 6.

In Modification 11 relating to the first to seventh embodiments, as shown in FIG. 26, at least one of the outside cameras 30a and the brightness sensor 40a may be provided exclusively for the HUD 50. FIG. 25 shows Modification 11 in which both the outside camera 30a and the brightness sensor 40a are provided exclusively for the HUD 50.

Figure 28:
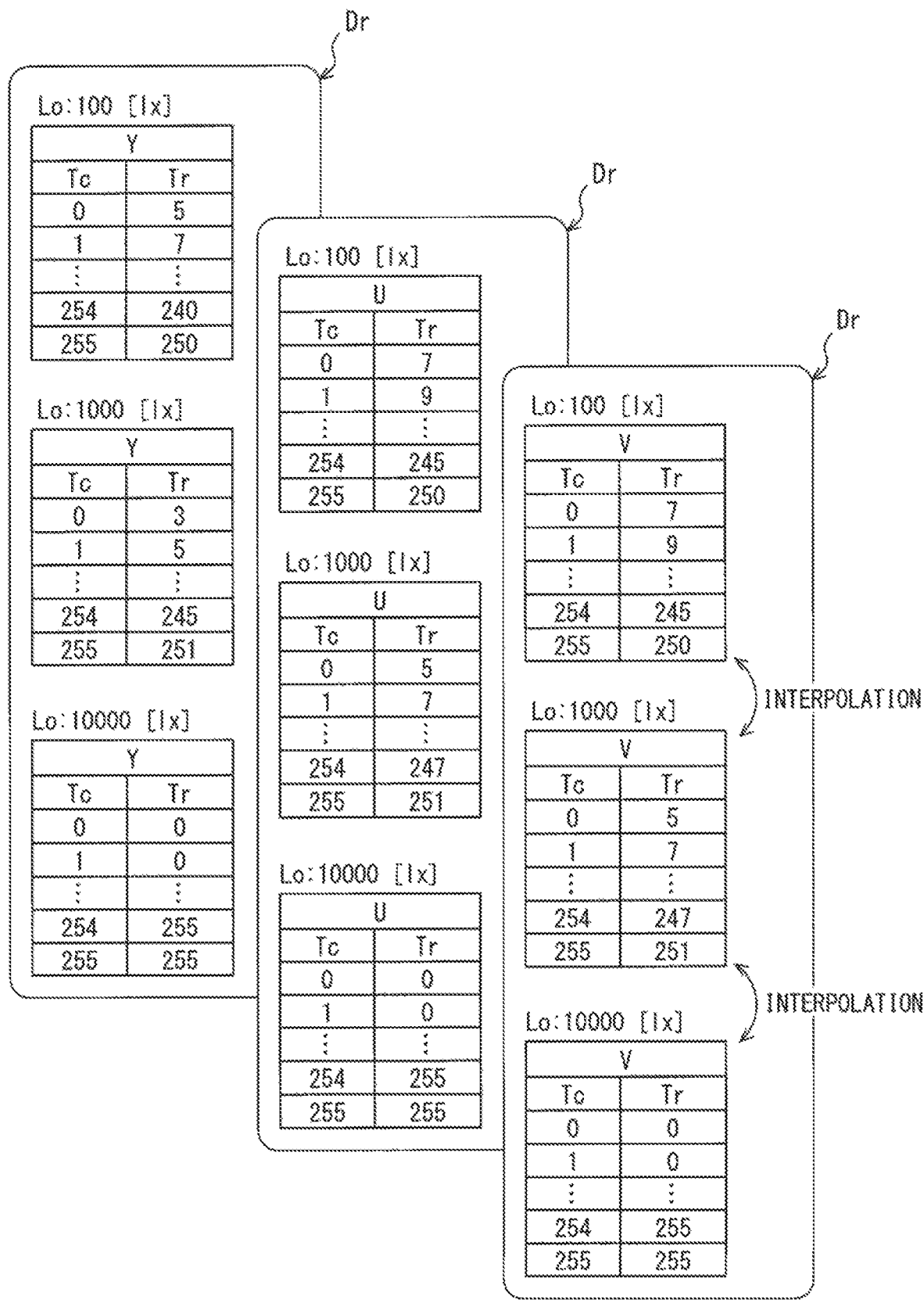
FIG. 28 is an image diagram showing correction data according to a modification of FIG. 8.

In Modification 12 relating to the first to seventh embodiments, as shown in FIG. 27, the imaging pixel value Tc may represent gradation values for the luminance (Y), the color difference (U) between Y and B, and the color difference (V) between Y and R. In other words, in Modification 12, the imaging pixel value Tc of each pixel is generated by the outside camera 30a in a YUV data format, and the correction data Dr is prepared for each of Y, U, and V as shown in FIG. 28. Therefore, in the case of Modification 12, the first to seventh embodiments can be realized by replacing each color and the specific color are replaced with each of Y, U, and V and a specific one of Y, U, and V (in an example of FIG. 28).

In Modification 13 relating to the first to seventh embodiments, individual correction data Dr for each color may be stored in the memory 54b by making the correlation between the imaging pixel value Tc and the correction pixel value Tr different for each color. In Modification 14 relating to the third embodiment, a value obtained by averaging the imaging pixel values Tc of the multiple pixel portion may be extracted multiple times in accordance with the first embodiment, and the correction pixel value Tr may be converted from the average pixel value Tcave obtained by further averaging the extracted values multiple times. In Modification 15 relating to the third embodiment, the imaging pixel value Tc of the most-pixel portion Pcm may be extracted multiple times in accordance with the second embodiment, and the correction pixel value Tr may be converted from the average pixel value Tcave obtained by averaging the extracted values multiple times.

In Modification 16 relating to the fifth to seventh embodiments, the conversion of the correction pixel value Tr may be performed from the imaging pixel value Tc of the most-pixel portion Pcm in each pixel area Pd or the specific pixel portion Pc in accordance with the second embodiment. In Modification 17 relating to the fifth to seventh embodiments, the average pixel value Tcave obtained by averaging the imaging pixel values Tc of the single-pixel portions extracted multiple times in each of the respective pixel areas Pd or the specific pixel portions Pc may be converted into the correction pixel value Tr in accordance with the third embodiment. In Modification 18 relating to the fifth to seventh embodiments, the average pixel value Tcave obtained by averaging the imaging pixel values Tc of the maximum-value pixel portions Pc1 extracted multiple times in each of the respective pixel areas Pd or the specific pixel portions Pc may be converted into the correction pixel value Tr in accordance with the fourth embodiment.

In Modification 19 relating to the seventh embodiment, the target weighting data Dwo may be reflected in the correction pixel value Tr for each color in the correction data Dr, instead of being reflected in Expressions 3 and 4 in which the pixel value control data Dct and the luminance value control data Dcs respectively follow. In the case of Modification 19, a value obtained by multiplying the correction pixel value Tr for each color described in the first embodiment by the target weighting data Dwo as the correction pixel value Tr corresponding to the display pixel value Td is introduced into Expression 3 in which Dwo=1 (in other words, same as Expression 1). In the case of Modification 19, a value obtained by multiplying the correction pixel value Tr of the specific color described in the seventh embodiment by the target weighting data Dwo as the correction pixel value Tr corresponding to the light source luminance value Sd is introduced into Expression 4 in which Dwo=1 (in other words, same as Expression 2).

In Modification 20, the seventh embodiment may be implemented in combination with the fifth embodiment. In Modification 21 relating to the seventh embodiment, the target weighting data Dwo for weighting the correction on the light source luminance value Sd rather than the display pixel value Td may be adopted. In Modification 22 relating to the first to fifth embodiments, a laser scanning type projector 51 may be employed. In Modification 22, the projector 51 adjusts the laser light intensities of the multiple colors in accordance with the display pixel values Td controlled by the HCU 54 to form the display images 56.

The invention claimed is:

1. A vehicle display device provided in a vehicle mounted with an outside camera that acquires a camera image by imaging outside scenery and a brightness sensor that detects an outside brightness of the outside scenery, the vehicle display device configured to project a display image onto a projection member, which transmits the outside scenery, to display the display image as a visible virtual image in a visual recognition region in a vehicle compartment, the vehicle display device comprising:
   a head-up display that emits light to form the display image;
   a memory that stores, as correction data, a correlation of a correction pixel value with respect to an imaging pixel value, the correction pixel value being converted from the imaging pixel value forming the camera image according to the outside brightness;
   a conversion block that converts, based on the correction data stored in the memory, the imaging pixel value of a specific pixel portion captured on a near side of at least one of a vanishing point or a horizon line in the camera image acquired by the outside camera into the correction pixel value in accordance with the outside brightness detected by the brightness sensor; and
   a display control block that controls a virtual image display luminance of the display image displayed by the head-up display in correspondence with the correction pixel value converted from the imaging pixel value by the conversion block.

2. The vehicle display device according to claim 1, wherein
   the head-up display displays the display image as the virtual image in a display region, and
   the display region is included in an imaging region of the outside camera and a detection region of the brightness sensor.

3. The vehicle display device according to claim 1, further comprising
   an average block that calculates an average pixel value by averaging imaging pixel values of a multiple pixel portion as the specific pixel portion of the camera image acquired by the outside camera, wherein
   the conversion block converts the average pixel value calculated by the averaging block into the correction pixel value.

4. The vehicle display device according to claim 1, further comprising
   an extraction block that extracts the imaging pixel value of a most-pixel portion, in which the number of pixels is greatest given a same imaging pixel value or within a same range, by comparing imaging pixel values of a multiple pixel portion as the specific pixel portion in the camera image acquired by the outside camera, wherein
   the conversion block converts the imaging pixel value of the most-pixel portion extracted by the extraction block into the correction pixel value.

5. The vehicle display device according to claim 1, further comprising:
   an extraction block that extracts the imaging pixel value of a single-pixel portion as the specific pixel portion from the camera image acquired by the outside camera; and
   an averaging block that calculates an average pixel value by averaging imaging pixel values of multiple single pixel portions extracted over a plurality of times by the extraction block, wherein the conversion block converts the average pixel value calculated by the average block into the correction pixel value.

6. The vehicle display device according to claim 1, further comprising:
    an extraction block that extracts the imaging pixel value of a maximum-value pixel portion having a largest imaging pixel value by comparing imaging pixel values of a multiple pixel portion as the specific pixel portion in the camera image acquired by the outside camera; and
    an averaging block that calculates an average pixel value by averaging imaging pixel values of multiple largest-value pixel portions extracted over a plurality of times by the extraction block, wherein
    the conversion block converts the average pixel value calculated by the average block into the correction pixel value.

7. The vehicle display device according to claim 1, further comprising:
    a division block that divides the specific pixel portion of the camera image acquired by the outside camera and a display region in which the display image is displayed as the virtual image by the head-up display into a plurality of corresponding pixel areas, wherein
    the conversion block converts imaging pixel values of the pixel areas of the specific pixel portion divided by the division block into corresponding correction pixel values, and
    the display control block controls the virtual image display luminance of each of the pixel areas of the display image displayed by the head-up display in association with the corresponding correction pixel value of each pixel area of the specific pixel portion converted from the imaging pixel value by the conversion block.

8. The vehicle display device according to claim 1, wherein
    the display control block adjusts a display pixel value of the display image formed by the head-up display in correspondence with the correction pixel value converted from the imaging pixel value of the specific pixel portion by the conversion block.

9. The vehicle display device according to claim 1, wherein the display control block adjusts a light source luminance value for causing the head-up display to emit the light of the display image in correspondence with the correction pixel value converted from the imaging pixel value of the specific pixel portion by the conversion block.

10. The vehicle display device according to claim 1, wherein
    the memory stores target weighting data for weighting correction of a display pixel value of the display image formed by the head-up display or a light source luminance value for causing the head-up display to emit the light of the display image more than that of the other, and
    the display control block adjusts the display pixel value and the light source luminance value in correspondence with the correction pixel value converted from the imaging pixel value of the specific pixel portion by the conversion block and in correspondence with the target weighting data stored in the memory.

11. A vehicle display system for a vehicle, comprising: an outside camera configured to acquire a camera image by imaging outside scenery; a brightness sensor that detects an outside brightness of the outside scenery; a head-up display configured to emit light to project a display image onto a light-transmissive projection member of the vehicle, the projected display image being displayed as a visible virtual image; a memory that stores, as correction data, a correlation of a correction pixel value with respect to an imaging pixel value forming the camera image, the correction pixel value being converted from the imaging pixel value according to the outside brightness; and one or more processors collectively programmed to: convert, based on the correction data stored in the memory, the imaging pixel value of a specific pixel portion captured on a near side of at least one of a vanishing point or a horizon line in the camera image acquired by the outside camera into the correction pixel value in accordance with the outside brightness detected by the brightness sensor, and control a virtual image display luminance of the display image displayed by the head-up display in correspondence with the correction pixel value converted from the imaging pixel value.

* * * * *